US011544666B2

(12) United States Patent
Hunsicker et al.

(10) Patent No.: US 11,544,666 B2
(45) Date of Patent: Jan. 3, 2023

(54) SYSTEMS AND METHODS FOR ELECTRONIC PLATFORM FOR INVENTORY SHARING

(71) Applicant: CaaStle, Inc., New York, NY (US)

(72) Inventors: Christine M. Hunsicker, New York, NY (US); Jaswinder Pal Singh, New York, NY (US); Georgiy Goldenberg, Los Altos, CA (US); Amy Kang, Richmond Hill, NY (US); Prashant T R Rao, San Jose, CA (US); Krishnan Vishwanath, San Jose, CA (US)

(73) Assignee: CaaStle, Inc., New York, NY (US)

( * ) Notice: Subject to any disclaimer, the term of this patent is extended or adjusted under 35 U.S.C. 154(b) by 0 days.

(21) Appl. No.: 17/197,700

(22) Filed: Mar. 10, 2021

(65) Prior Publication Data
US 2022/0292440 A1    Sep. 15, 2022

(51) Int. Cl.
*G06Q 10/08*    (2012.01)
(52) U.S. Cl.
CPC .................. *G06Q 10/087* (2013.01)
(58) Field of Classification Search
CPC ............ G06Q 30/00; G06Q 10/087; G05B 2219/34256; G06F 16/252; H04N 21/25
See application file for complete search history.

(56) References Cited

U.S. PATENT DOCUMENTS

| | | | | |
|---|---|---|---|---|
| 2006/0095333 A1* | 5/2006 | Gambhir | .............. | G06Q 10/087 705/28 |
| 2013/0066753 A1* | 3/2013 | Doyle | .................. | G06Q 10/087 705/28 |
| 2013/0151381 A1* | 6/2013 | Klein | .................... | G06Q 10/087 705/27.1 |
| 2014/0180697 A1* | 6/2014 | Torok | ...................... | G10L 15/26 704/275 |
| 2015/0088703 A1* | 3/2015 | Yan | ...................... | G06Q 10/087 705/28 |

(Continued)

OTHER PUBLICATIONS

Yuri Subach, "Why choose microservices (and why not to)", Jun. 14, 2020 (Year: 2020).*

(Continued)

*Primary Examiner* — Florian M Zeender
*Assistant Examiner* — Vanessa Deligi
(74) *Attorney, Agent, or Firm* — Bookoff McAndrews, PLLC

(57) ABSTRACT

A computer-implemented method may include hosting an article sharing portal accessible by the one or more electronic tenant interfaces, the article sharing portal being responsive to actions performed with the one or more electronic tenant interfaces to create, modify, or delete inventory data for sharing one or more articles across a plurality of inventories. The method may include receiving user selections initiated at user platforms for articles described in the received wearable article data, including a first shared article included in an electronic inventory of a first tenant, the first shared article being placed in the electronic inventory of the first tenant by the actions performed with the one or more electronic tenant interfaces for sharing the articles, and in response to receiving the one or more user selections, initiating one or more microservices to facilitate physical shipment of the first shared article to a user.

20 Claims, 11 Drawing Sheets

(56) References Cited

U.S. PATENT DOCUMENTS

| | | | |
|---|---|---|---|
| 2017/0124511 A1* | 5/2017 | Mueller | H04W 4/029 |
| 2017/0178060 A1* | 6/2017 | Schwartz | G06V 10/44 |
| 2017/0255898 A1 | 9/2017 | Thomas | |
| 2020/0349635 A1 | 11/2020 | Ghoshal et al. | |
| 2021/0133670 A1* | 5/2021 | Cella | G06N 5/022 |
| 2022/0067108 A1* | 3/2022 | Roy | G06F 21/6227 |

OTHER PUBLICATIONS

International Search Report and Written Opinion issued in PCT/US2022/018365 dated Jun. 21, 2022 (11 pages).

* cited by examiner

SYSTEMS AND METHODS FOR ELECTRONIC PLATFORM FOR INVENTORY SHARING

TECHNICAL FIELD

Aspects of the present disclosure relate to an electronic platform for distribution and inventory management of wearable items and, more particularly, to dynamically managing electronic data associated with shared inventories of articles, such as wearable items.

BACKGROUND

Online rental and/or subscription-based services typically offer a single, unified catalog of items to a plurality of users. Individual items of the catalog of items can be tracked, enabling the service provider to ensure that, under most circumstances, sufficient physical products are available to satisfy user interest. Catalogs change infrequently, typically due to significant, predictable events, such as seasonal changes, the introduction of new products, etc. Even when multiple catalogs are maintained by a single entity, each catalog may be associated with a separate inventory, or a plurality of separate inventories. However, such services do not include infrastructure for hosting or otherwise providing the ability to share items in one or more physical inventories and support dynamic changes to the inventories. In somewhat more complex services, a plurality of individually-branded inventories are offered to different sets of users. Physical inventories of such services are managed individually so that, when identical products are offered in more brands or services, physical products are allocated to a specific brand or service with separately-managed inventories.

Conventional systems also lack the capability to facilitate inventory sharing across different entities. For example, some systems can provide functionality that allows different entities to manage separate inventories, but are not configured to manage the complexity involved with managing various types of data for facilitating inventory sharing by these entities. Additionally, while online rental and/or subscription-based services rely on vast amounts of information for inventory management, existing systems are unable to harness this information to provide suitable inventory exchange services for placement of articles in a plurality of different electronic storefronts, or for managing relationships between different tenant devices that interact with the service to dynamically add, change, or remove shared articles.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for dynamically managing electronic data associated with shared inventories of wearable items and/or exchange of one or more articles across individually-managed inventories of a plurality of tenants, including tenants having different roles (e.g., supplier-side tenants, demand-side tenants, hybrid tenants, and/or facilitation tenants).

In one aspect, a computer-implemented method for managing data associated with electronic inventory management of wearable articles may include receiving, by one or more processors, wearable article data from one or more electronic tenant interfaces, the wearable article data describing wearable articles made available for physical shipment to users via electronic transactions, wherein the one or more electronic tenant interfaces are accessible over one or more networks, and hosting, by the one or more processors, an article sharing portal accessible by the one or more electronic tenant interfaces, the article sharing portal being responsive to actions performed with the one or more electronic tenant interfaces to create, modify, or delete inventory data for sharing one or more articles across a plurality of inventories. The method may include receiving, by the one or more processors, one or more user selections initiated at one or more user platforms for one or more articles described in the received wearable article data, including a first shared article included in an electronic inventory of a first tenant, the first shared article being placed in the electronic inventory of the first tenant by the actions performed with the one or more electronic tenant interfaces for sharing the one or more articles, and in response to receiving the one or more user selections, initiating one or more microservices to facilitate physical shipment of the first shared article to a user associated with the one or more user platforms.

In another aspect, a computer system for managing data associated with electronic inventory management of wearable articles may include a memory having processor-readable instructions stored therein and one or more processors configured to access the memory and execute the processor-readable instructions, which when executed by the one or more processors configures the one or more processors to perform a plurality of functions. The functions may include functions for receiving, by the one or more processors, wearable article data from one or more electronic tenant interfaces, the wearable article data describing wearable articles made available for physical shipment to users via electronic transactions, wherein the one or more electronic tenant interfaces are accessible over one or more networks, and hosting, by the one or more processors, an article sharing portal accessible by the one or more electronic tenant interfaces, the article sharing portal being responsive to actions performed with the one or more electronic tenant interfaces to create, modify, or delete inventory data for sharing one or more articles across a plurality of inventories. The functions may also include functions for receiving, by the one or more processors, one or more user selections initiated at one or more user platforms for one or more articles described in the received wearable article data, including a first shared article included in an electronic inventory of the first tenant, the first shared article being placed in the electronic inventory of the first tenant by the actions performed with the one or more electronic tenant interfaces for sharing the one or more articles, and in response to receiving the one or more user selections, initiating one or more microservices to facilitate physical shipment of the first shared article to a user associated with the one or more user platforms.

In yet another aspect, a non-transitory computer-readable medium may contain instructions for performing functions for managing data associated with electronic inventory management of wearable articles, the functions including receiving wearable article data from one or more electronic tenant interfaces, the wearable article data describing wearable articles made available for physical shipment to users via electronic transactions, wherein the one or more electronic tenant interfaces are accessible over one or more networks, and hosting an article sharing portal accessible by the one or more electronic tenant interfaces, the article sharing portal being responsive to actions performed with the one or more electronic tenant interfaces to create, modify, or delete inventory data for sharing one or more articles across a plurality of inventories. The functions may also include receiving one or more user selections initiated at one or more user platforms for one or more articles described in the received wearable article data, including a first shared article included in an electronic inventory of the first tenant, the first shared article being placed in the electronic inventory of the first tenant by the actions performed with the one or more electronic tenant interfaces for sharing the one or more articles, and in response to receiving the one or more user selections, initiating one or more microservices to facilitate physical shipment of the first shared article to a user associated with the one or more user platforms.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
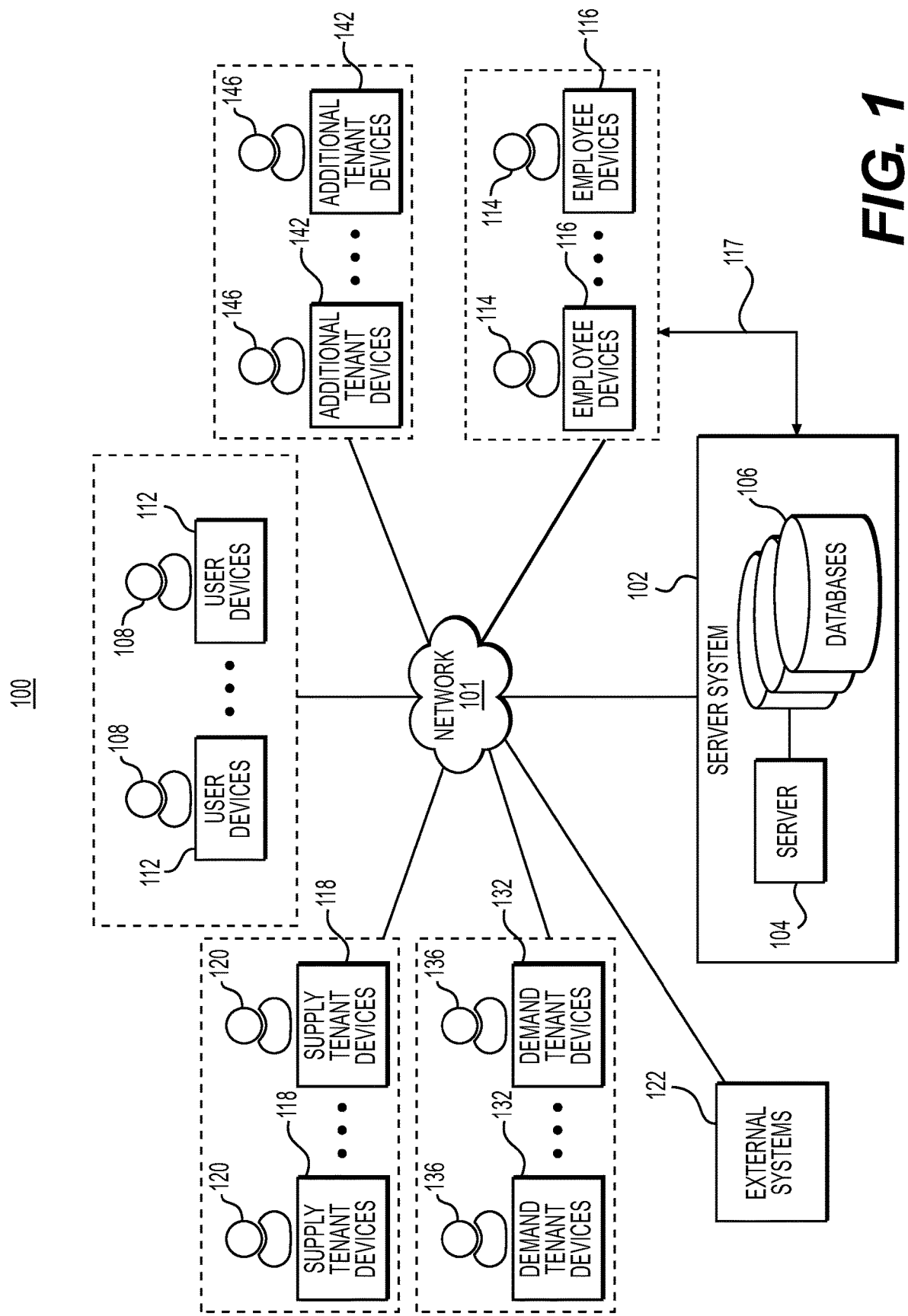
FIG. 1 is a block diagram of an exemplary environment in which methods, systems, and other aspects of the present disclosure may be implemented.

The following embodiments describe systems and methods for dynamically managing inventory data associated with articles, such as apparel or other wearable item subscriptions. In particular, aspects of the present disclosure may relate to systems and methods for managing shared inventories for a plurality of tenants.

While the exemplary system architecture as described in the present disclosure relates to electronic transactions for subscribing to, purchasing, or renting wearable items (e.g., clothing-as-a-service (CaaS) or Try-Then-Buy (TTB) service), implementations disclosed herein may effectively serve various other online transactions in the context of any other subscription, purchase, rental, or retail services without departing from the scope of the disclosure, such as, for example, subscribing to or making purchases in a software service, cleaning service, delivery service, maintenance service, rental product, rental vehicles, etc. In addition, while some descriptions and examples disclosed in the present disclosure refer to certain exemplary transactions as transactions pertaining to "apparel," "garments," "wearable articles," or "wearable items," all of those transactions may effectively serve any article or consumer good without departing from the scope of the disclosure.

As used in the present disclosure, the term "CaaS" (i.e., clothing-as-a-service) may collectively refer to computer-implemented services and functions associated with subscription, purchase, and/or rental services for users (e.g., periodic subscription for receiving wearable items, apparel rental or purchase order, distribution, return processing, TTB services, account management, marketing, customer service, warehouse operations, etc.). As used in the present disclosure, the terms "wearable item" and/or "wearable article" may refer to any article of clothing, apparel, jewelry, hat, accessories, or other product which may be worn by a person, an animal, or a thing, or be used as an ornament for a person, an animal, or a thing. As used herein, the term "closeting" or "to closet" may refer to a computer-implemented operation of placing one or more garments into a virtual closet (e.g., a cart, a repository, or any type of space which may be virtually associated with a particular set of one or more garments for a future transaction). Additionally, "matching" may refer to a computer-implemented operation of determining a set of one or more garments for allocating to a user and/or determining wearability metrics for given garments, and "allocating" or "allocation" may refer to a computer-implemented operation of determining the garments that should be assigned and shipped to one or more particular users. An "inventory" may refer to a plurality of articles that are associated with one or more entities. A "catalog" may refer to a plurality of articles associated with one or more tenants, such as one or more articles presented via an electronic storefront and/or via an interface of an inventory exchange. The term "physical inventory" includes articles physically provided to a logistics center, warehouse, or one or more other location(s).

In accordance with the present disclosure, user interfaces, periodically executed computer-implemented services, ad hoc services, and automations being integrated together in a connected platform may be achieved by a uniquely configured system architecture, configuring one or more processors to perform storefront and back office tasks, and various user interfaces providing specialized or customized access to tenants associated with one or more roles. For example, the system may collect vast amounts of information and data attributes from historical transactions with end users, historical transactions or other interactions on an inventory exchange, form data sets indicative of different tenant's relationships with certain articles and/or other tenants, etc. These interfaces, services, and automations may be useful for operating and managing an inventory exchange and synchronizing information between the inventory exchange and storefronts associated with the various tenants.

Article merchants, and in particular, apparel retailers, are often responsible not only for creating articles (e.g., apparel or other wearable items) but also for generating demand and marketing these products. These requirements can extend into rental services (including subscription services) where tenants desire, in at least some systems, to provide both demand (customers) and supply (inventory) to the platform. The inventory exchange systems and methods described herein may, in at least some embodiments, enable the unbundling of demand generation and supply ownership by allowing for the cross-listing of rental inventory, allowing tenants to occupy one of a plurality of roles to which they are well-suited. For example, a tenant currently engaged in apparel manufacturing can increase the benefits they receive from engaging a CaaS platform by interacting with an inventory exchange. Tenants associated with a brand having an established base can extend marketing to a CaaS that caters to this base without the need to engage in the manufacture of inventory.

In one particular example, fashion publications can have established relationships with subscribers, readers, etc., have little or no experience in manufacturing articles, such as wearable articles. These magazines can create demand for an apparel subscription by partnering with inventory owners (e.g., supply tenants) through the exchange platform. In another example, a niche inventory owner that is engaged in supply of articles to boutiques, for example, can partner with existing rental services (e.g., demand tenants) and cross-list inventory using the exchange platform. The new activities enabled by the systems and methods described herein can increase the usage and utility of a CaaS Platform.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment or aspect of the disclosure and the phrase "in another embodiment" as used herein does not necessarily refer to a different embodiment or aspect of the disclosure. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

I. Exemplary CaaS System Environment

Referring now to the drawings, FIG. 1 shows an example environment 100, according to one or more embodiments of the present disclosure. As shown, the example environment 100 may include one or more networks 101 that interconnect a server system 102, user devices 112, employee devices 116, tenant devices 118, 132, 142, and external systems 122. The one or more networks 101 may be, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users 108, employee devices 116 may be accessed by authorized employees 114, and tenant devices 118, 132, 142 may be accessed by end-users associated with different tenant entities 120, 136, 146, as described below. In some implementations, employee devices 116 may be used to perform or supplement the functions of the tenant devices 118, 132, 142 and/or the user devices 112. A server system 102 may comprise one or more servers 104 and one or more databases 106, which may be configured to store and/or process a plurality of data, microservices, and service components, and/or associated functions thereof, as described in more detail below with respect to FIGS. 2 and 3.

Users 108 may access the server system 102 through the one or more networks 101 via user devices 112. Each device among the user devices 112 may be any type of computing device (e.g., personal computing device, mobile computing device, etc.) which allows users 108 to display a web browser or a web-based application for accessing the server system 102 through the network 101. User devices 112 may, for example, be configured to display a web browser, a web-based application, or any other user interface (e.g., one or more mobile applications) for allowing users 108 to exchange information with other device(s) or system(s) in environment 100 over the one or more networks 101. For example, user devices 112 may load an application with a graphical user interface (GUI), and the application may display on the GUI one or more apparel recommendations for closeting by the user. Users 108 accessing user devices 112 may be, for example, users and/or potential users of articles made available for subscription-based distribution via electronic transactions and physical shipment. Additionally, or alternatively, users 108 may access user devices 112 to, for example, manage one or more user accounts, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features such as size advisor, perform personalized discovery, and/or make recommendations.

Employee devices 116 may be configured to be accessed by one or more employees 114, including, for example, customer service employees, marketer employees, warehouse employees, analytics employees, or any other employees who are authorized and/or authenticated to perform tasks, operations, and/or transactions associated with server system 102, and/or external systems 122. In one embodiment, employee devices 116 are owned and operated by the same entity or at least an affiliate of the entity operating the e-commerce (e.g., CaaS) business hosted on server systems 102. Each employee device 116 may be any type of computing device (e.g., personal computing device, mobile computing devices, etc.). Employee devices 116 may allow employees 114 to display a web browser or an application for accessing the server system 102 and/or the external systems 122, through the one or more networks 101. For example, an employee device 116 may load an application with graphical user interface (GUI), and the application may display on the GUI one or more warehouse operations associated with providing CaaS to users 108. In some implementations, employee devices 116 may communicate directly with server system 102 via communications link 117, bypassing public networks 101. Additionally, or alternatively, employee devices 116 may communicate with server system 102 via network 101 (e.g., access by web browsers or web-based applications).

Tenant devices 118, 132, 142 may be configured to be accessed by one or more tenants, such as one or more supply tenants 120, one or more demand tenants 136, and/or one or more additional tenants 146, which may include hybrid tenants and/or facilitation tenants, as described below. Each device among the tenant devices 118, 132, 142 may be any type of computing device (e.g., personal computing device, mobile computing devices, etc.). As used herein, each tenant, including one or more tenants 120, 136, 146, may refer to an entity that receives, supplies, shares, and/or facilitates sharing, for one or more collections of apparel for one or more CaaS inventories, or performs one or more actions to facilitate inventory sharing. For example, each tenant 120, 136, 146 may be a retailer, a designer, a manufacturer, a merchandiser, or a brand owner entity that supplies or otherwise makes available one or more collections (e.g., catalogs) of wearable items to one or more CaaS inventories managed and/or accessed by the server system 102.

Tenants 120, 136, 146 may be configured to interact with each other in an inventory exchange in accordance with respective roles, as described below. For example, supply-side or supply tenants 120 may be entities that provide a plurality of articles to one or more physical inventories of a CaaS, and ultimately, for use by other tenants, such as one or more demand-side or demand tenants 136. Demand tenants 136 may, via one or more electronic storefronts, make these articles available to one or more users 108. It should be appreciated that a tenant may not always be a "supply tenant" vs. a "demand tenant." Rather, a tenant may be a supply vs. demand tenant depending on which side of a transaction the tenant is on, for any given transaction. It is contemplated that, at any given moment, a tenant may be a "demand tenant" with respect to a first transaction with another first tenant, while simultaneously acting as a "supply tenant" with respect to a second transaction with a another second tenant. Thus, additional tenants 146 may include tenants that act as both supply and demand tenants 120, 136, and/or tenants that facilitate inventory sharing across electronic storefront catalogs of a plurality of tenants (e.g., one or more supply tenants 120 and one or more demand tenants 136).

As described in more detail below with respect to FIG. 3, tenants 120, 136, 146 may use one or more electronic tenant interfaces (e.g., a catalog content management system associated with each tenant) to provide server system 102 with wearable item data that describe apparel or wearable items made available for inventory sharing via server system 102. For example, one or more catalogs for each of the one or more tenants 120, 136, 146 may be generated and/or updated at the server system 102 dynamically and/or periodically. Server system 102 may further facilitate inventory sharing via an inventory exchange. For example, one or more articles may be designated or selected for inclusion in the inventory exchange, where such articles may be identified by tenants for inclusion in one or more storefront catalogs.

Tenant devices 118, 132, 142 may serve as access terminals for the tenants 120, 136, 146 for communicating with electronic tenant interfaces and/or other subsystems hosted at server system 102. Tenant devices 118, 132, 142 may, for example, be configured to display a web browser, an application, or any other user interface for allowing tenants 120, 136, 146 to load electronic tenant interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. Specific examples of the external systems 122 are described in detail below with respect to FIGS. 2 and 3. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101.

As indicated above, FIG. 1 is provided merely as an example. Other examples that differ from the example environment 100 of FIG. 1 are contemplated within the scope of the present embodiments. In addition, the number and arrangement of devices and networks shown in environment 100 are provided as an example. In practice, there may be additional devices, fewer devices and/or networks, different devices and/or networks, or differently arranged devices and/or networks than those shown in environment 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 118, 132, in addition to their own functions.

II. Exemplary CaaS Architecture

Figure 2:
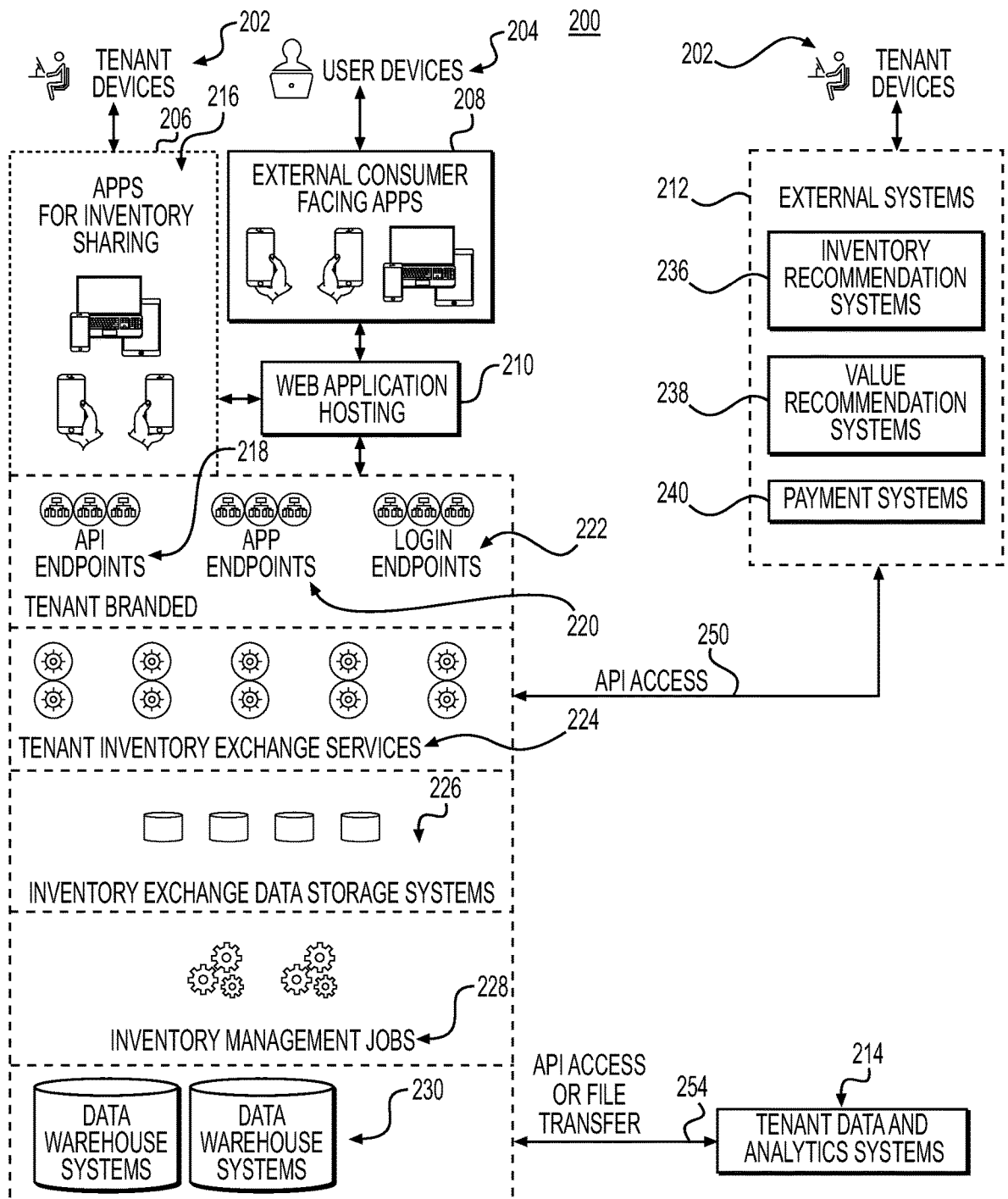
FIG. 2 is a schematic diagram depicting an architecture of an exemplary environment for dynamically-updateable shared inventories of articles, such as wearable items, of an electronic platform for offering the articles as a service, according to one or more embodiments.

FIG. 2 is a schematic diagram of an exemplary architecture 200 for an electronic platform for clothing-as-a-service and/or articles-as-a-service utilizing shared inventories, according to one or more embodiments. The components of architecture 200 may be accessed by authorized terminals, such as tenant devices 202 and user devices 204, over the one or more networks 101 or via any one or more other types of network (e.g., a cellular network, a public land mobile network, a local area network, a wide area network, a metropolitan area network, a telephone network, a private network, an ad hoc network, an intranet, the internet, a fiber optic based network, a cloud computing network, etc.). As used herein, user devices 204 may correspond to any one or more user devices 112 of users 108 depicted in FIG. 1. One or more of the employee devices 116 depicted in FIG. 1 may also access architecture 200 (e.g., via one or more internal applications). Tenant devices 202 may correspond to tenant devices 118 of supply tenants 120, tenant devices 132 of demand tenants 136, and/or devices 142 of additional (hybrid and/or facilitation) tenants 146. Tenant devices 202 may, in at least some circumstances, also correspond to one or more employee devices 116.

As shown in FIG. 2, in general, architecture 200 may comprise an internal system 206, external consumer facing apps 208, a web application hosting server 210, external systems 212, and applications for inventory sharing 216 which may be part of internal system 206 and/or formed by one or more external tenant facing applications. If desired, architecture 200 may include one or more tenant data and analytics systems (not shown) to assess performance of, for example, individually-branded storefronts of tenants 120, 136, 146. Internal system 206 may comprise applications for inventory sharing 216, API endpoints 218, APP endpoints 220, login endpoints 222, tenant inventory exchange services 224, and inventory data stores or data storage systems 226.

II.A. Internal System

In operation, tenant devices 202 may access internal system 206, which may be stored at networked, distributed, and/or local systems (e.g., one or more virtual private clouds and/or one or more physical private networks). As used herein, a virtual private cloud may refer to a configurable pool of shared computing resources within a cloud environment, with groups of shared computing resources being allocated for a particular job(s), user(s) and/or a purpose(s). The outer boundary of the internal system 206 depicted in dashed lines, encompassing subcomponents 216-230 (with applications 216 being depicted in lighter dashed lines to indicate that components may be included in internal and/or external systems), may represent a virtual private cloud allocated for hosting the entirety of the internal system 206. Additionally, the inner boundaries within internal system 206, also depicted in dashed lines, may indicate multiple virtual private clouds (e.g., subsets of the larger virtual private cloud encompassing the internal system 206), each allocated for one or more particular tasks, users, or purposes (e.g., tenant inventory exchange services 224, inventory management jobs 228, and data warehouse systems 230).

Tenant devices 202 may communicate with internal system 206 through one or more applications for inventory sharing 216 comprising one or more web-based portals or user interfaces for operations, including operations for accessing an inventory exchange. Each portal may generate or present a graphical user interface on a display of one or more tenant devices 202. Applications for inventory sharing 216 may be, for example, a shared inventory content management system, an inventory transfer portal, an inventory management portal, and/or an exchange facilitation portal, as described in more detail below with respect to FIGS. 3-8. Tenants 120, 136, 146 may use devices 202 to access internal system 206 to perform inventory management, inventory sharing, valuation, and/or exchange facilitation tasks.

In addition to applications for inventory sharing 216, internal system 206 may include internal applications, such as one or more web-based user interfaces. These interfaces may include one or more mobile applications compatible with predetermined mobile device operating systems, a software application developed for desktop operating systems, and/or a web site configured for browser access to web pages via one or more networks (e.g., the Internet or an intranet). Employees 114 may use devices employee devices (e.g., user devices 204) to access internal system 206 to perform additional tasks, such as CaaS functions related to warehouse operations and/or administrative tasks.

Internal system 206 may also include Application Programming Interface ("API") endpoints 218, APP (application) endpoints 220, and login endpoints 222. In some implementations, these endpoints may be hosted in a virtual private cloud or a physical private network. API endpoints 218 may be locations from which the APIs can access resources of the internal system 206 that the APIs need to carry out their functions. For example, the API endpoints 218 may specify where resources can be accessed by the APIs, while communicating with the APIs requesting information from the internal system 206. APP endpoints 220 may be the locations from which applications (e.g., applications for inventory sharing 216, one or more internal applications) may access resources of the internal system 206 they need to carry out their functions, and the login endpoints 222 may be the touchpoints of any communication pertaining to logins (e.g., authentication and access control) associated with internal system 206. Login endpoints 222 may receive and process login communications for applications for inventory sharing 216 and/or external consumer facing applications 208. At least some endpoints among the API endpoints 218, APP endpoints 220, and login endpoints 222, may be tenant-branded endpoints, designated to serve particular tenants 120, 136, 146.

In some aspects, different interfaces or functionalities may be associated with a role of each tenant 120, 136, 146 (e.g., supply tenants, demand tenants, hybrid tenants, or facilitation tenants), the role being determined based on login information received via one or more of the API endpoints 218, APP endpoints 220, and login endpoints 222. Additionally or alternatively, separate API endpoints 218, APP endpoints 220, and/or login endpoints 222 may be provided for one or more particular tenant roles.

Internal system 206 may include tenant inventory exchange services 224 that facilitate inventory sharing or other inventory exchange functions, as well as inventory exchange data storage systems 226 for storing information useful for operating, updating, and analyzing one or more aspects of the inventory exchange. Tenant inventory exchange services 224 may include microservices for fulfillment of various CaaS operations hosted in one or more virtual private clouds or one or more physical private networks, including microservices that facilitate inventory exchange by facilitating changes in articles offered via the exchange, changes in tenant inventories based on articles selected via the exchange, and/or changes in valuation assigned to articles and/or to tenants engaged with the inventory exchange. In particular, one or more of these microservices may be configured to support inventory exchange, value assessment and assignment, and exchange facilitation, as described in more detail below with respect to microservices 356 (FIG. 3). Additional microservices of internal system 206 may include, for example, catalog data, account data, data services, customer service functions, marketing functions, warehouse functions, and/or other supporting functions.

Inventory exchange data stores or storage system 226 may be one or more databases that store both raw and processed data resulting from operations of tenant inventory exchange services 224, endpoints 218-222, external systems 212, and/or tenant data and analytics systems 214. Inventory exchange data storage systems 226 may store, for example, inventory sharing data indicative of articles that were or are currently offered for sharing (inclusion in one or more tenant storefront catalogs), currently and previously shared articles, current and historical article sharing valuations, performance of one or more shared articles (e.g., a frequency or number of times one or more shared articles are selected by other tenants, a frequency or number of times one or more shared articles are placed in a storefront of another tenant, a frequency or number of times one or more shared items were selected by a subscribing user form a storefront of another tenant), among others. The data stored in data storage system 226 may include transactional data, batch jobs data, searchable data including various analytics and attributes, event messages, and local logs of various raw data.

Internal system 206 may additionally include inventory management jobs 228. Inventory management jobs 228 may be hosted in, for example, one or more virtual private clouds. Inventory management jobs 228 may include, for example, system components that run and update data associated with internal system 206 that are useful for inventory exchange and article sharing. In particular, system components of inventory management jobs 228 may be configured to receive and dynamically update data associated with articles that are offered for inventory sharing, currently shared articles, and/or articles that were previously shared and present in storefront catalogs associated with (e.g., branded) a plurality of different tenants 120, 136, 146. These system components may include, for example, historical sharing data for each tenant and each individual article or group of articles associated with one or more identifiers, snapshot data indicative of a current or recent (e.g., within 24 hours, within one week, etc.) status information of a plurality of shared articles currently available from a plurality of tenants 120, 136, 146 for selection (e.g., closeting) by one or more user users 108, and/or valuation data associated with the historical and/or snapshot data. Jobs 228 may also include system components useful for generating recommendations presented by tenant devices 202, such as recommendations of one or more articles to offer in an exchange or recommendations of or more articles, offered in an exchange catalog of the inventory exchange, for inclusion in a storefront catalog.

Figure 3:
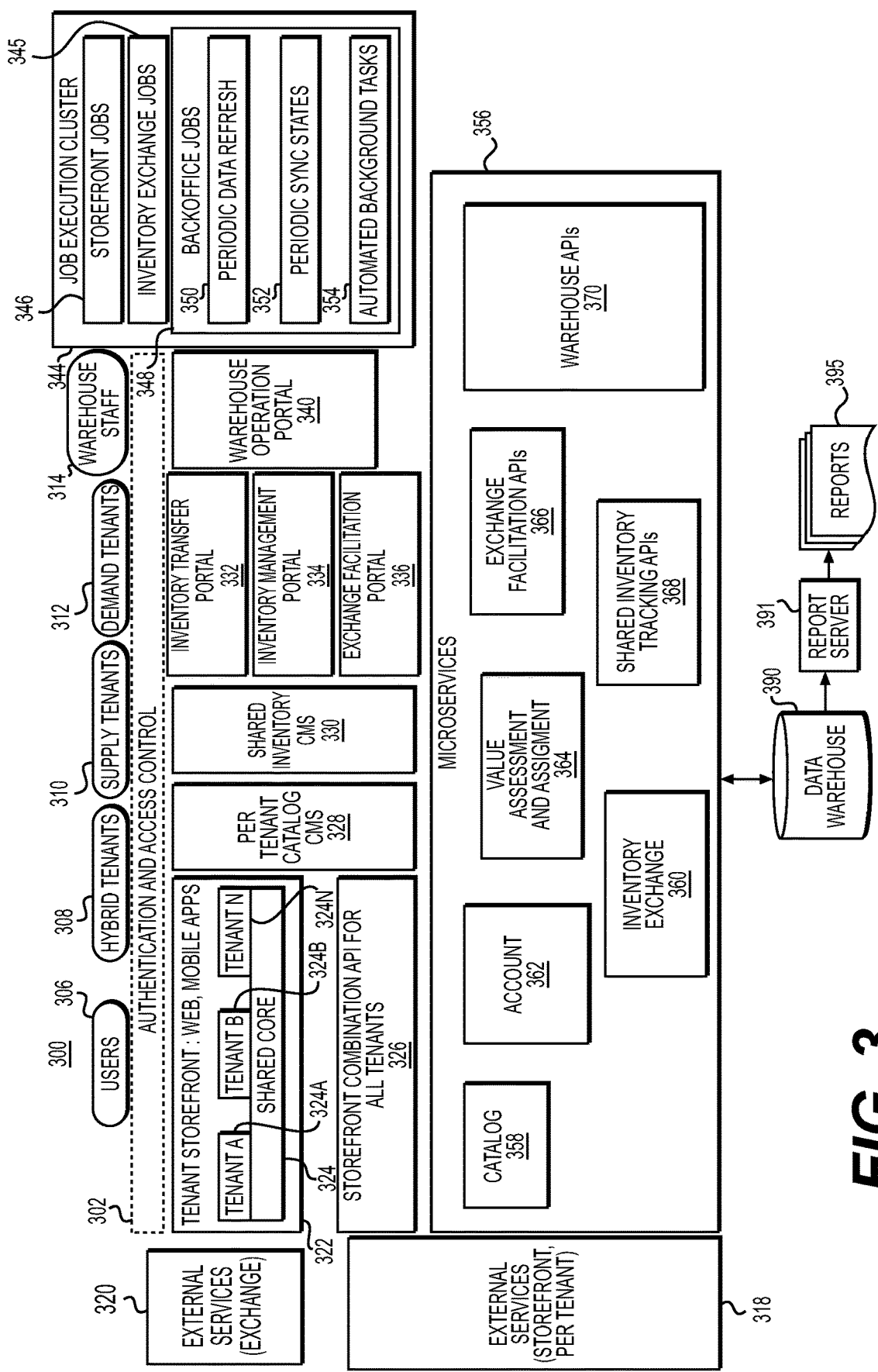
FIG. 3 is a schematic diagram depicting the architecture of an exemplary server system for an electronic platform with dynamically-updateable shared inventories, according to one or more embodiments.

Jobs 228 may also include, for example, periodic data refresh operations, periodic synchronization states among internal and external services, and automated tasks to run in the background at internal system 206, as described in more detail below with respect to job execution cluster 346 (FIG. 3). Additional jobs for internal system 206 for supporting other aspects of CaaS may include, for example, ETL (extract, transform, and load) processes that comprise collecting data from multiple different sources, converting the collected data to other one or more preset formats as deemed necessary, and loading the data into the target database (e.g., data warehouse systems 230). Additional system components useful for jobs of environment 200 may include, for example, replenishment identifier (RID) generation service(s), size advisor data set, size advisor algorithmic preparation component(s), recommendation service(s) for generating recommendations to end users, search data sets, etc.

Internal system 206 may include file stores or databases that store snapshots which may include the above-described snapshot data. For example, snapshots associated with inventory exchange systems may be stored in inventory exchange data storage system 226, which may be included in one or more virtual private clouds or one or more physical private networks. Snapshots stored in system 226 may include data representative of a current status of an inventory exchange. Other snapshots may capture states of aspects of internal system 206 other than an inventory exchange. For example, each snapshot may capture settings, files, configurations, and the memory state of the components of the internal system 206.

These snapshots may be restored upon request or scheduling, and when a snapshot is restored, settings, and/or the state of the internal system 206, including components of the inventory exchange, may be returned to the states they were in at the time the snapshots was captured. Internal system 206 may include third party data ETL processes which may collect data from different external sources (e.g., external systems 212), convert the collected data to other one or more preset formats, and load the data into one or more target databases.

Internal system 206 may include the data warehouse systems 230 in one or more virtual private clouds or one or more physical private networks. As discussed above, data warehouse systems 230 may include one or more target databases for ETL processes that collect data from various sources (e.g., external systems 212 or inventory exchange data storage systems 226). Data warehouse systems 230 may then utilize the collected data as, for example, parameters for business intelligence that reveals patterns, analytics, and insights for inventory sharing. In particular, data warehouse systems 230 may store information useful for performing analytics for an inventory exchange, such as identities and roles of tenants engaged in the inventory exchange, articles currently offered in the inventory exchange, articles that are currently shared in two or more tenant inventories after being offered and selected via the inventory exchange, etc. Analytics may be performed, based on information of data warehouse systems 230, by components of internal system 206 (e.g., inventory management jobs 228) and/or with one or more external systems 212 (e.g., inventory recommendation systems 236 and/or value recommendation systems 238).

Analysis of information stored in data warehouse systems 230 may be used for one or more reporting tools useful for monitoring the performance of one or more entities (supply tenants, demand tenants, hybrid tenants, or facilitation tenants) and/or one or more articles involved in the inventory exchange. For example, such analyses may be useful for the generation and presentation of information representative of performance analytics of one or more articles offered via an exchange, performance analytics of one or more storefronts presenting articles that are shared via an exchange, performance analytics of a particular tenant (e.g., performance of a tenant's inventory listed in the exchange and/or performance of one or more tenant-specific storefronts), the performance of one or more particular tenant roles (e.g., a group of supply, demand, hybrid, facilitation tenants), etc.

With continued reference to FIG. 2, environment 200 may also include user devices 204, which may correspond to user devices 112 (FIG. 1). Users 108 of the CaaS electronic platform may use the user devices 204 to access the internal system 206, as recipients of the services provided by the components of the internal system 206 (e.g., as subscribing users that receive articles offered as a service, including one or more articles that are present in tenant inventories via inventory exchange, as described below). For example, users 108 of user devices 204 may be one or more registered subscribers who physically receive and wear items that are distributed via the CaaS electronic platform. As shown in FIG. 2, user devices 204 may access the internal system 206 via external consumer facing applications 208. External consumer facing applications 208 may be browser-accessed web pages or web-based applications that include web-based user interfaces accessible from one or more user devices 204 over one or more networks (e.g., one or more networks 101).

In some implementations, web application hosting server 210 acts as an intermediary for enabling communications made between tenant devices 202 and internal system 206, between employee devices and internal system 206, and between user devices 204 and internal system 206. Internal system 206 may present different communications interfaces (e.g., applications) based on an identity supplied by devices 202 and 204, such as a tenant, employee, or user. In particular, internal system 206 may further provide different communications interfaces based on a particular role supplied by tenant devices 202 (e.g., a role corresponding to supply tenants 120, demand tenants 136, hybrid tenants, or facilitation tenants).

Web application hosting server 210 may be an external (e.g., third party) server or internal (e.g., intranet, local network) server or host that provides an online platform for an inventory exchange that may be accessed by tenant devices 202. This inventory exchange may provide a management interface (e.g., via inventory management portal 334, described below) for viewing, selecting, and modifying, articles offered in the inventory exchange, and/or a retailer storefront interface (e.g., via inventory transfer portal 332, described below) for interacting with one or more articles offered on the inventory exchange by other tenants which can be selected for inclusion in one or more storefronts. Additionally, the inventory exchange may include a facilitation interface (e.g., via exchange facilitation portal 336) for facilitating exchange (e.g., by browsing items in the inventory exchange and recommending articles to tenants associated with the inventory exchange, as described below. These interfaces, supporting systems and processes (e.g., components of environment 200 and/or server system 300), which are collectively or individually referred to herein as an "inventory exchange," may facilitate the ability of tenants to list one or more articles that are available for inclusion in an inventory of another tenant, review of articles from other tenants for inclusion in a consumer storefront presented via user devices 204, and set, create, or modify values associated with listing one or more articles in a virtual inventory when these articles are purchased, involved in a TTB transaction, closeted, etc.

When web application hosting server 210 communicates with user devices 204 of one or more subscribing users 108, web application hosting server 210 may present a web-based consumer storefront interface integrating online retail components (e.g., online point-of-sale system) onto the consumer storefront interface. Web application hosting server 210 may communicate with the internal system 206 (e.g., the API endpoints 218, the APP endpoints 220, a device 202 or 204 logged into the internal system 206), to retrieve necessary information about the internal system 206, and to generate or dynamically update an inventory exchange storefront for tenant devices 202 or a consumer storefront for user devices 204.

Each of the interfaces accessed by tenant devices 202 via applications for inventory sharing 216 may be dynamically-updated by web application hosting server 210. Applications 216 may allow tenant devices 204 to communicate with internal system 206 and with one or more external systems 212 to facilitate the operation and update of the above-described management and retailer storefront interfaces of the inventory exchange. API access communication links 250 may enable communication with external systems 212.

II. B. Supporting System(s)

External systems 212 may be configured to perform data analytics or other tasks that support inventory sharing operations performed by tenant inventory exchange services 224 and/or inventory management jobs 228. For example, external systems 212 may include one or more inventory recommendation systems 236, value recommendation systems 238, and payment systems 240.

Inventory recommendation systems 236 may generate recommendations identifying one or more articles that are current available for inventory sharing, but that are not yet part of an inventory exchange, and thus not offered to other tenants. Additionally or alternatively, inventory recommendation systems 236 may generate recommendations indicative of a quantity of additional articles, and an identity of these articles, that are recommended for inclusion in a physical inventory supplied by the tenant to ensure sufficient count of a specific article is present to maximize the effectiveness of the inventory exchange. Such recommendations may be generated for and presented, via tenant devices 202, to one or more of the above-described tenants. Inventory recommendation systems 236 may additionally generate recommendations for a tenant to add one or more articles that are currently part of an inventory exchange (e.g., articles offered by one or more supply tenants 120 in an exchange catalog). Such recommendations may be generated for demand tenants 136 and/or hybrid tenants. If desired, inventory recommendation systems 236 may be included within internal system 206.

Value recommendation systems 238 may include one or more analytics services that determine a value associated with an article in an inventory exchange (e.g., an article made available to one or more demand tenants 136 from one or more supply tenants 120). Value recommendation systems 238 may generate recommendations, presented on tenant devices 202, and indicative of an appropriate inventory listing value (e.g., a daily, weekly, monthly, or yearly fee for listing a supplied article in an inventory), exchange listing value (e.g., a daily, weekly, monthly, or yearly fee for listing an article from the exchange in one or more storefronts) and/or purchasing share (e.g., a distribution of proceeds when an shared article is purchased). Value recommendation systems 238 may generate recommendations for articles that are currently available via an inventory exchange and/or for articles that are not currently made available by an inventory exchange.

Inventory recommendations, value recommendations, or both, may be generated based on analysis of a current physical inventory of a particular tenant 120, 136, 146 and historical data of one or more articles (e.g., closeting frequency, TTB or purchase frequency, etc.). The recommendations may further be made based on characteristics of articles in a tenant's inventory (e.g., style, size, color, pattern, manufacturer, brand, replacement cost, purchase cost, etc.), and historical performance of similar articles (e.g., articles sharing one or more characteristics with an article associated with the recommendation) or of identical articles. In particular, inventory recommendation systems 236 may recommend articles that are highly likely to be requested (e.g., closeted) and actually worn by one or more users 108 based on historical data stored in data warehouse systems 230. This information may be supplied via API access 250 from inventory exchange data storage systems 226 and/or data warehouse systems 230.

Payment systems 240 may facilitate payments between tenants to facilitate inventory sharing. Payment systems 240 may, for example, facilitate payments between tenants with shared articles. Payment systems 240 may provide, a payment tool in the form of a cloud-based platform configured to accept payments from tenants with a website or within the platform's mobile application (e.g., tenant devices 202, 118, and/or 132). Payment systems 240 may generate invoices and/or reports based on a relationship between a plurality of tenants. For example, for a pair of tenants that each share articles to each other's storefront catalogs, payment systems 240 may be configured to review the shared articles in each inventory and generate reports and/or invoices by calculating a net difference between inventory listing fees and/or purchasing shares over a predetermined period of time (e.g., one month). Payment systems 240 may also include payment processing components to process payments and/or attempted transactions. Payment systems 240 may be accessed by tenant devices 202 to retrieve payments and utilize payment analytics data for business intelligence (e.g., by identifying articles that perform well, as indicated by having a closeting, TTB, or purchase frequency that is greater than a predetermined threshold).

Environment 200 may include tenant data and analytics systems 214 configured to analyze and present information relevant to an article exchange or other aspects of system 200. Tenant data and analytics systems 214 may include computing resources in communication with one or more components of internal system 206 that collect, store, and/or manage data and analytics associated with the one or more tenants 120, 136. One or more of the tenant data and analytics systems 214 may be located remotely from the internal system 206 (e.g., at tenant servers). Tenant data and analytics systems 214 may communicate with one or more components of internal system 206 using API access or file transfer link 254 over one or more networks 101 (FIG. 1). For example, tenant data and analytics systems 214 may communicate with API endpoints 218 of internal system 206, or receive files from third-party data ETL processes. Tenant data and analytics systems 214 may be accessed by tenant devices 202, and, which may correspond to tenant devices 118, 132, 142 (FIG. 1), and, if desired, to employee devices 116.

The number and arrangement of devices, components, and communication networks shown in FIG. 2 are provided as an example. In practice, there may be additional devices, components, and/or communication networks, fewer devices, components, and/or communication networks, different devices, components, and/or communication networks, or differently arranged devices, components, and/or communication networks than those shown in FIG. 2. Furthermore, two or more devices shown in FIG. 2 may be implemented within a single device, or a single device shown in FIG. 2 may be implemented as multiple, distributed devices. Additionally or alternatively, a set of devices (e.g., one or more devices) of environment 200 may perform one or more functions described as being performed by another set of devices of environment 200.

III. Server System

FIG. 3 is a diagram showing the architecture of an exemplary server system 300 for facilitating inventory sharing, e.g., via an inventory exchange, for an electronic platform offering articles, such as wearable items, as a service. Server system 300 may correspond to server system 102 depicted in FIG. 1, and to internal system 206 depicted in FIG. 2.

Server system 300 may be accessed by a plurality of entities having different roles, such as users 306 (e.g., subscribing users of the CaaS electronic platform), hybrid tenants 308, supply tenants 310, demand tenants 312, and employees of the CaaS electronic platform, such as warehouse staff 314. Each of these entities may access server system 300 via authentication and access control 302.

Users 306 may correspond to users 108 (FIG. 1). Users 306 may use their computing devices (e.g., user devices 204) to access the server system 300, as recipients of the CaaS electronic platform services provided by the components of the server system 300. For example, the users 306 may be one or more registered subscribers who closet one or more articles by reviewing storefront catalogs of one or more tenants, and physically receive and wear the apparel that are distributed via the CaaS operations. Users 306 may log in to server system 300 to initiate tasks associated with one or more CaaS operations, such as, for example, account management, storefront catalog viewing, closeting items, providing return notifications, etc.

Supply tenants 310 may correspond to supply tenants 120. Demand tenants 312 may correspond to demand tenants 136. Hybrid tenants 308 may have characteristics of both a supply tenant 310 and a demand tenant 312. Thus, hybrid tenants 308 may correspond to additional tenants 146, as well as to one or more supply tenants 120 and/or demand tenants 136. Exemplary roles of tenants 308, 310, 312 are described below with respect to FIG. 8.

Hybrid tenants 308 may have one or more storefront catalogs of inventory that is offered via the CaaS electronic platform via one or more tenant storefronts. The storefront catalog(s) may include articles of a physical inventory that includes a plurality of articles that were physically supplied to one or more warehouses as a physical inventory of the hybrid tenant 308. The one or more storefront catalogs may also include one or more articles that are included in a different physical inventory supplied by a different tenant (e.g., another hybrid tenant 308, a supply tenant 310, and/or a demand tenant 312).

Supply tenants 310 may include entities whose physical inventory is at least partially made available and offered via the inventory exchange. Supply tenants 310 may list articles in one or more exchange catalogs without directly offering any articles to users 306. Thus, supply tenants 310 may, if desired, only offer articles via the exchange platform, and not on any tenant storefront.

Demand tenants 312 may include entities that have a reduced physical inventory or no physical inventory. In particular, storefront catalogs of demand tenants 312, including articles offered to users 306 in a storefront of demand tenants 312, may be formed mostly, or entirely, by shared inventory (e.g., articles of one or more supply tenants 310 and/or hybrid tenants 308). In some aspects, demand tenants 312 may not list any articles on the exchange for selection by other tenants.

Warehouse staff 314 may correspond to employees 114 and other users of devices 116, and may access a warehouse operation portal 340 or other portals to support CaaS operations, as described below. Warehouse staff 314 or other employees 114 may log in to server system 300 and, via warehouse portal 340 or other portals may initiate, view, manage, enter data in, or perform administrative tasks related to warehouse and other operations.

In order to control access to server system 300, entities 306-314 may communicate with authentication and access control component 302, which may grant access to the server system 300 only if the access-requesting entity is successfully authenticated based on the access control conditions corresponding to the particular entity. Access control conditions may be stored in a memory in communication with server system 300, and may be applied to a particular entity based on various entity-specific factors, such as, for example, the authorized role(s) of each entity, the device being used by each entity, the portal sought to be accessed, and/or the geographic location of each entity.

External services 318 may be services associated with tenant-specific storefronts. Services 318 may provide, for example, customer support services, marketing and advertisement services, content management systems for building and updating each tenant-specific storefront, and analytics services for tracking and reporting the performance of the tenant-specific storefronts.

External services 320 may include services that are configured for use with an inventory exchange between tenants 308, 310, 312. These external services 320 may include, for example, recommendation systems for article suggestions of articles listed or not yet listed on an inventory exchange, valuation services for managing valuations of articles listed on the inventory exchange, and analytics services for analyzing and reporting performance of articles on the exchange (e.g., analytics representative of the frequency with which articles listed on the exchange are selected for placement in an inventory of another tenant, average valuations of these articles, etc.).

Tenant storefront 322 may include storefronts be accessed by users 306 for closeting articles included in one or more storefront catalogs, and may include web-based user interfaces. In particular, tenant storefront 322 may include a different interface for each tenant, such as a storefront interface 324A unique to tenant A, a storefront interface 324B unique to tenant B, and a storefront interface 324N unique to tenant N. Each tenant-specific interface may include a shared core 324 common to all tenants. Tenant storefront 322 may communicate with other components of server system 300 (e.g., external services 318, per tenant catalog CMS 328, and/or microservices 356) using storefront combination API 326. Each tenant storefront 322 may present a plurality of articles for closeting by users 306. These articles may include one or more shared inventory articles, and in the case of a storefront of a demand tenant 312, may be entirely formed of shared articles.

Tenants 308, 310, 312 may access per tenant catalog content management system (CMS) 328. The per tenant catalog CMS 328 may comprise a portal that includes one or more user interfaces for communicating with tenants 308, 310, 312 to create, modify, and/or update one or more article catalogs for the tenant storefront 322 (e.g., catalogs of the storefront interface 324A for tenant A). Per tenant catalog CMS 328 may be in communication with the external services 318. External services 318 may include online storefront management services, including subcomponents, such as a storefront user interface building/updating tool and a dashboard for managing sales operations as orders, payments, and/or shipping. Data maintained by one or more of the external services 318 may also be communicated to the per tenant catalog CMS 328. Communication between the per tenant catalog CMS 328 and the external services 318 may be performed by, for example, storefront combination API 326, and/or data exchange over the one or more networks 101.

Tenant storefront 322 may be accessed by users 306 for closeting articles, and may include web-based user interfaces. In particular, tenant storefront 322 may include a different interface for each tenant, such as a storefront interface 324A unique to tenant A, a storefront interface 324B unique to tenant B, and a storefront interface 324N unique to tenant N. Each tenant-specific interface may include a shared core 324 common to all tenants. Tenant storefront 322 may communicate with other components of server system 300 (e.g., external services 318, per tenant catalog CMS 328, and/or microservices 356) using storefront combination API 326. Each tenant storefront 322 may present a plurality of articles available for closeting by users 306. These articles may include one or more shared inventory articles, and in the case of a storefront of a demand tenant 312, may be entirely formed of articles shared via the inventory exchange.

Tenants 308, 310, 312 may access per tenant catalog content management system (CMS) 328. The per tenant catalog CMS 328 may comprise a portal that includes one or more user interfaces for communicating with tenants 308, 310, 312 to create, modify, and/or update one or more apparel catalogs for the tenant storefront 322 (e.g., storefront catalogs in the storefront interface 324A for tenant A). Per tenant catalog CMS 328 may be in communication with the external services 318. External services 318 may include online storefront management services, including subcomponents such as a storefront user interface building/updating tool and a dashboard for managing sales operations as orders, payments, and/or shipping. Data maintained by one or more of the external services 318 may also be communicated to the per tenant catalog CMS 328. Communication between per tenant catalog CMS 328 and external services 318 may be performed by, for example, storefront combination API 326, and/or data exchange over the one or more networks 101.

Tenants 308, 310, 312 may each access shared inventory CMS 330. Shared inventory CMS 330 may, in conjunction with inventory transfer portal 332, inventory management portal 334 and/or one or more additional portals, provide user interfaces for receiving inputs from tenants 308, 310, 312 to create, modify, and/or update how one or more exchange catalogs for the inventory exchange (e.g., article catalogs that may be viewed by one or more tenants 308, 310, 312 by inventory management portal 332) are presented to other tenants. In particular, shared inventory CMS 330 may allow tenants 308, 310, 312 to modify aspects of an exchange storefront (e.g., a storefront specific to the inventory exchange and accessible via inventory transfer portal 332) such as layout, design, etc. If desired, shared inventory CMS 330 may operate in conjunction with inventory management portal 334 to allow tenants 308, 310, 312 to add, modify, or remove particular articles listed in an exchange catalog (one or a group of articles that are offered by one or more tenants to other tenants via the exchange).

At the server system 300, warehouse staff 314 may access a warehouse operation portal 340. Warehouse staff 314 authorized for such access may be one or more employees associated with warehouse operations of the CaaS electronic platform of the server system 300. Warehouse portal 340 may include one or more user interfaces at which warehouse staff 314 may, for example, initiate, view, manage, enter data in, or perform administrative tasks related to warehouse operations. The warehouse portal 340 may communicate with microservices 356, including, for example, warehouse APIs 370. Among the warehouse APIs 370, service components that may communicate with the warehouse operation portal 340 may be, for example, order processing, item photoshoot, inventory, inventory location, garment allocation, order fulfillment, shipping label management, package and shipment operations, return processing, laundry, and cycle count.

Warehouse APIs 370 may facilitate the management of shared inventories that are located in one or more distribution centers, such that a particular warehouse may include articles that are shared between a plurality of tenants among tenants 308, 310, 312. Warehouse APIs 370 may facilitate the management of article allocation via one or more databases, for example. Data for a particular shared article that is managed via warehouse APIs 370 may identify each tenant that is sharing the article, the tenant that supplied the article, and other data stored in data warehouse 390 (and in inventory exchange database 410, 710, and/or valuation database 712, described below).

Portals 332, 334, 336, and 340 may communicate with one or more components of microservices 356, and/or external services 318, 320, via one or more suitable APIs and/or over the one or more networks 101. Suitable APIs may include, for example, APIs access communication links 250 and/or 254 (FIG. 2). In at least some configurations, portals 332, 334, 336, and/or 340 may correspond to applications for inventory sharing 216, external systems 212, or both (FIG. 2).

Within server system 300, a group of hosts (e.g., computing resources) may form a job execution cluster 344. Job execution cluster 344 may utilize the combined computing power and shared resources of the hosts to process one or more jobs (e.g., workloads) of server system 300. Job execution cluster 344 may, for example, dynamically allocate the combined computing power and the shared resources of the hosts, to perform one or more jobs associated with storefront, back office, and inventory exchange tasks. For a plurality of different jobs, the allocation of the computing power and the resources may be prioritized based on predetermined criteria, such as, for example, criticality, cost, time/order of receipt, and/or urgency.

Job execution cluster 344 may be configured to execute inventory exchange jobs 345, storefront jobs 346, and back office jobs 348. Inventory exchange jobs 345 may configure job execution cluster 344 to perform background tasks triggered by one or more actions of tenants 308, 310, 312. These tasks may be triggered by an interaction with one or more of portals 332, 334, 336. For example, if a supply tenant 310 selects an article offered via the inventory exchange by a demand tenant 312 (e.g., for inclusion in an inventory of this supply tenant 310), job execution cluster 344 may perform tasks, such as calling one or more APIs among microservices 356. These APIs may include, for example, user authentication (e.g., password login), article recommendation, value recommendation, article inventory assignment, article value assignment, catalog update, payment, etc.). Additionally or alternatively, job execution cluster may update or store exchange request data (e.g., data corresponding to a transaction according to the selection of the article) and call one or more external services components of services 320.

Storefront jobs 346 may configure job execution cluster 344 to perform background tasks triggered by actions of users 306 at tenant storefront 322. For example, if a first user among users 306 initiated an order for one or more garment for shipment to the first user, job execution cluster 344 may execute a series of tasks under storefront jobs 346. Inventory exchange jobs 345 and storefront jobs 346 may be performed on demand at server system 300, whenever tenant or user actions are received at inventory exchange (e.g., via portals 332, 334, 336) or tenant storefront 322.

Back office jobs 348 may configure the job execution cluster 344 to perform tasks such as periodic data refresh 350, periodic synchronization states 352, and automated background tasks 354. In some implementations, back office jobs 348 may correspond to, or include, inventory management jobs 228 (FIG. 2). Job execution cluster 344 may execute jobs scheduled under periodic data refresh 350, in accordance with one or more predetermined data refresh schedules. During each iteration of a job under periodic data refresh 350, applicable variable data (e.g., metrics, scores, recommendation outputs, prices, etc.) stored in databases associated with data warehouse 390 may be refreshed based on the values of the input parameters captured at the time of execution. For example, periodic data refresh 350 may refresh the values and/or data associated with the inventory exchange, such as inventory assignment, article valuation, catalog revenue, article and/or value recommendations, etc. Periodic data refresh 350 may also refresh values and/or data associated with user functions, such as matching and fulfillment operations, pricing, achievable service level (ASL) and item retirement, discovery and recommendation, and other data science jobs.

Job execution cluster 344 may also execute one or more jobs scheduled under periodic synchronization states 352. For example, a job under periodic synchronization states 352 may synchronize states between microservices 356 and external states (e.g., external services 318 and 320). Job execution cluster 344 may execute jobs scheduled under automated background tasks 354, such as tasks triggered from portals 332, 334, 336 based on actions of tenants 308, 310, 312. A job under automated background tasks 354 may also be generated in response to an action of one or more employees such as warehouse staff 314.

Server system 300 may include microservices 356 that are available for deployment as APIs. Microservices 356 may correspond to the tenant inventory exchange services 224 depicted in FIG. 2. Microservices 356 may be services hosted at the virtual private clouds, as shown in FIG. 2, and may include catalog 358, inventory exchange 360, account 362, value assessment 364, exchange facilitation APIs 366, shared inventory tracking APIs 368, and warehouse APIs 370.

Catalog 358 may include service components such as, for example, products (e.g., item attributes and identifiers), collections (e.g., groups of products), and/or size charts (e.g., size charts specific to tenants 308, or canonical sizes set internally for server system 300). Catalog 358 microservices may be useful for maintaining and managing interactions with tenant storefronts 322 and storefront catalogs. Catalog 358 may include service components for associating each article and/or group of articles with one or more storefronts associated with the article or group.

Inventory exchange 360 may include service components for articles (e.g., article attributes and identifiers), collections (e.g., groups of articles), or both. In particular, inventory exchange 360 may include service components for matching individual articles (e.g., individual article identifiers) and/or groups of articles (e.g., group article identifiers) with identities (e.g., unique identifiers and/or storefront identifiers) of each tenant or groups of tenants. For example, inventory exchange 360 may pair tenant identities with identities of articles supplied by the tenant (e.g., a physical inventory of the tenant). Inventory exchange 360 may also associate articles with a particular exchange storefront and may be useful for maintaining or managing interactions with exchange storefronts or other interfaces facilitated by portals 332, 334, 336.

Account 362 may include service components such as, for example, new account creation, password login, social network login, password reset, single sign-on function(s), and/or session renewal function(s). These service components may be activated by users 306 for accessing storefronts 322, tenants 308, 310, 312 for accessing per tenant catalog CMS 328, shared inventory CMS 330, inventory transfer portal 332, inventory management portal 334, and/or exchange facilitation portal 336, or by warehouse staff 314 for accessing warehouse operation portal 340.

Value assessment and assignment 364 services may include service components for assigning one or more of an inventory listing value, exchange listing value, and/or purchasing share for articles. These service components may initiate communication with value recommendation systems 238 or, when value recommendation systems 238 are included in internal system 206, may include components for calculating an appropriate inventory listing value, exchange listing value, and/or purchasing share for one or more articles.

Exchange facilitation APIs 366 may include one or more service components initiated by interactions (e.g., by one or more facilitation tenants) with exchange facilitation portal 336. Exchange facilitation APIs 366 may include service components for inter-tenant communication (e.g., inter-tenant article suggestions, inter-tenant fee structure suggestions, inter-tenant negotiations, etc.).

Shared inventory tracking APIs 368 include service components for shared inventory management and article monitoring. For example, shared inventory tracking APIs 368 may include service components for shared article assignment (e.g., creating, modifying, and removing associations between one or more articles and a plurality of catalogs of different tenants) and inventory status (e.g., creating or updating data identifying users 306 currently in possession of one or more articles and an identity of the tenant associated with the storefront form which the one or more articles were closeted). For example, shared inventory tracking APIs 368 may monitor a quantity of physical articles available, and modify storefront catalogs of one or more tenants when an entirety of these articles are selected by users 306 and depleted. Thus, shared inventory tracking APIs 368 may facilitate real-time allocation of shared articles.

Warehouse APIs 370 may include service components such as, for example, order processing, photoshoot (e.g., capturing electronic images of articles being made available for rental or purchase transactions), warehouse inventory (e.g., computer-implemented functions associated with inventory management of items to be rented or purchased), warehouse location (e.g., locating item in a warehouse), garment allocation (e.g., allocating certain items for shipment to a particular user), fulfillment (e.g., fulfilling initiated orders), shipping label (e.g., generating, modifying, or outputting shipping labels), package and shipment (e.g., computer-implemented functions associated with packaging, sorting, and/or delivering the shipments out to users 306), return processing (e.g., processing return items that have been received at a warehouse), laundry (e.g., computer-implemented functions associated with performing laundry of the returned items), and/or cycle count (e.g., computer-implemented functions associated with counting cycles that each wearable item have gone through).

Microservices 356 may be in communication with a plurality of databases, including, for example, databases included in data warehouse 390. Data warehouse 390 may include one or more data repositories that are dynamically updated based on tenant interactions with per tenant catalog CMS 328, shared inventory CMS 330, portals 332, 334, and/or 336, etc.

At server system 300, an ETL system may extract, transform, and load various data outputs into data warehouse 390, so that data warehouse 390 may serve as a unified source of data that are used for business intelligence or business analytics, including analytics indicative of the performance of the inventory exchange. For example, the ETL system 388 may collect data from multiple different sources, convert the collected data to preset formats, and load the data into the data warehouse systems 390. In some implementations, the data warehouse 390 may correspond to the data warehouse systems 230 (FIG. 2).

As shown in FIG. 3, data warehouse 390 may be in communication with a report server 391. Report server 391 may be an external data visualization engine which may be configured to collect data from data warehouse 390 and generate reports focused on business intelligence and analytics. Reports may be scheduled and/or automated with preconfigured settings (e.g., applicable time periods, input parameters, output metrics, output format, etc.), to produce reports 395. Additionally, or alternatively, ad hoc requests may be received from one or more tenants 308, 310, 312, such that report server 391 may respond to the ad hoc requests by generating and communicating reports 395.

The number and arrangement of devices, components, and communication networks shown in FIG. 3 are provided as an example. In practice, there may be additional devices, components, and/or communication networks, fewer devices, components, and/or communication networks, different devices, components, and/or communication networks, or differently arranged devices, components, and/or communication networks than those shown in FIG. 3. Furthermore, two or more devices shown in FIG. 3 may be implemented within a single device, or a single device shown in FIG. 3 may be implemented as multiple, distributed devices. Additionally or alternatively, a set of devices (e.g., one or more devices) associated with server system 300 may perform one or more functions described as being performed by another set of devices associated with server system 300.

IV. Exemplary Inventory Exchange Implementations

Figure 4:
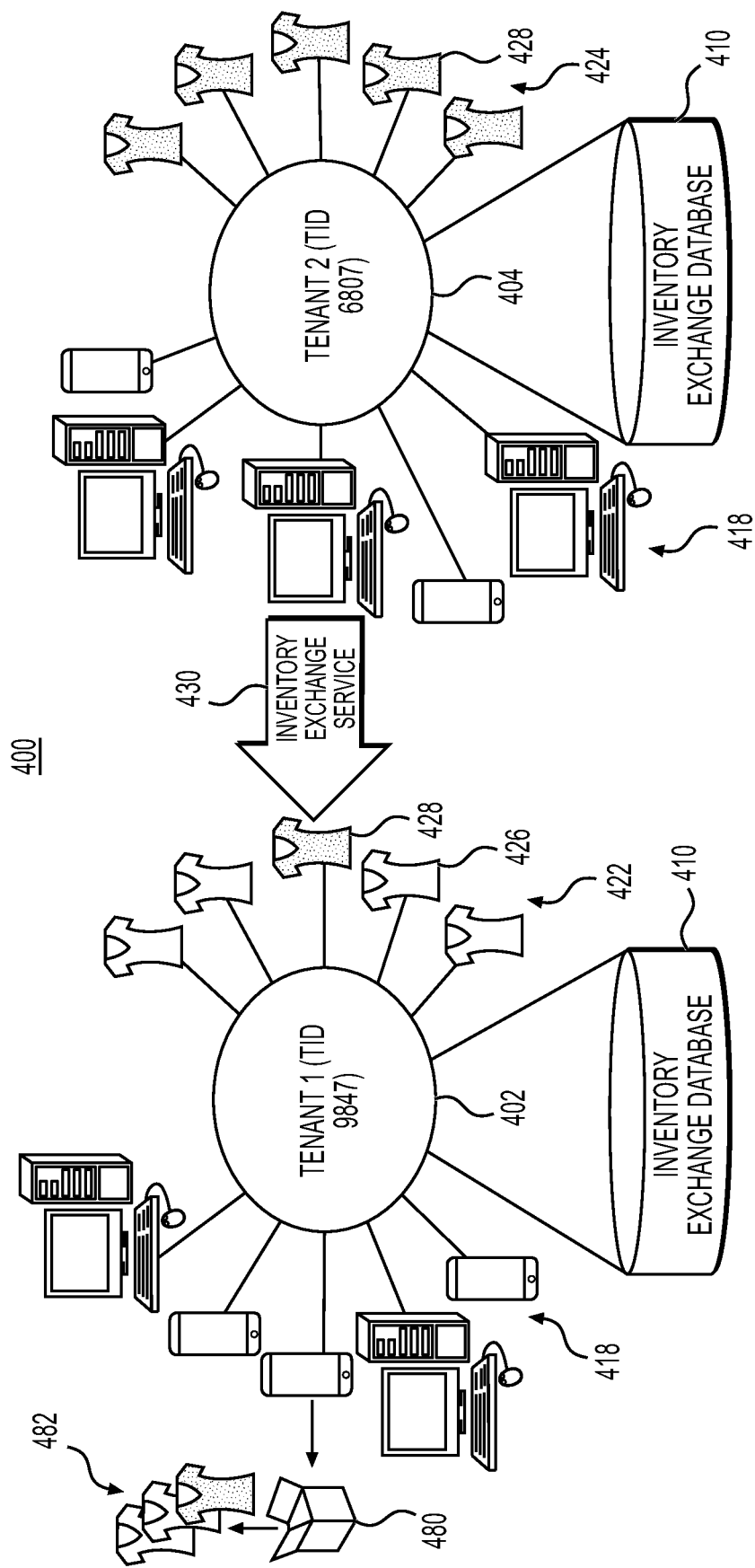
FIG. 4 is a diagram of methods of a plurality of tenants interacting with an exemplary inventory exchange service.
Figure 5A:
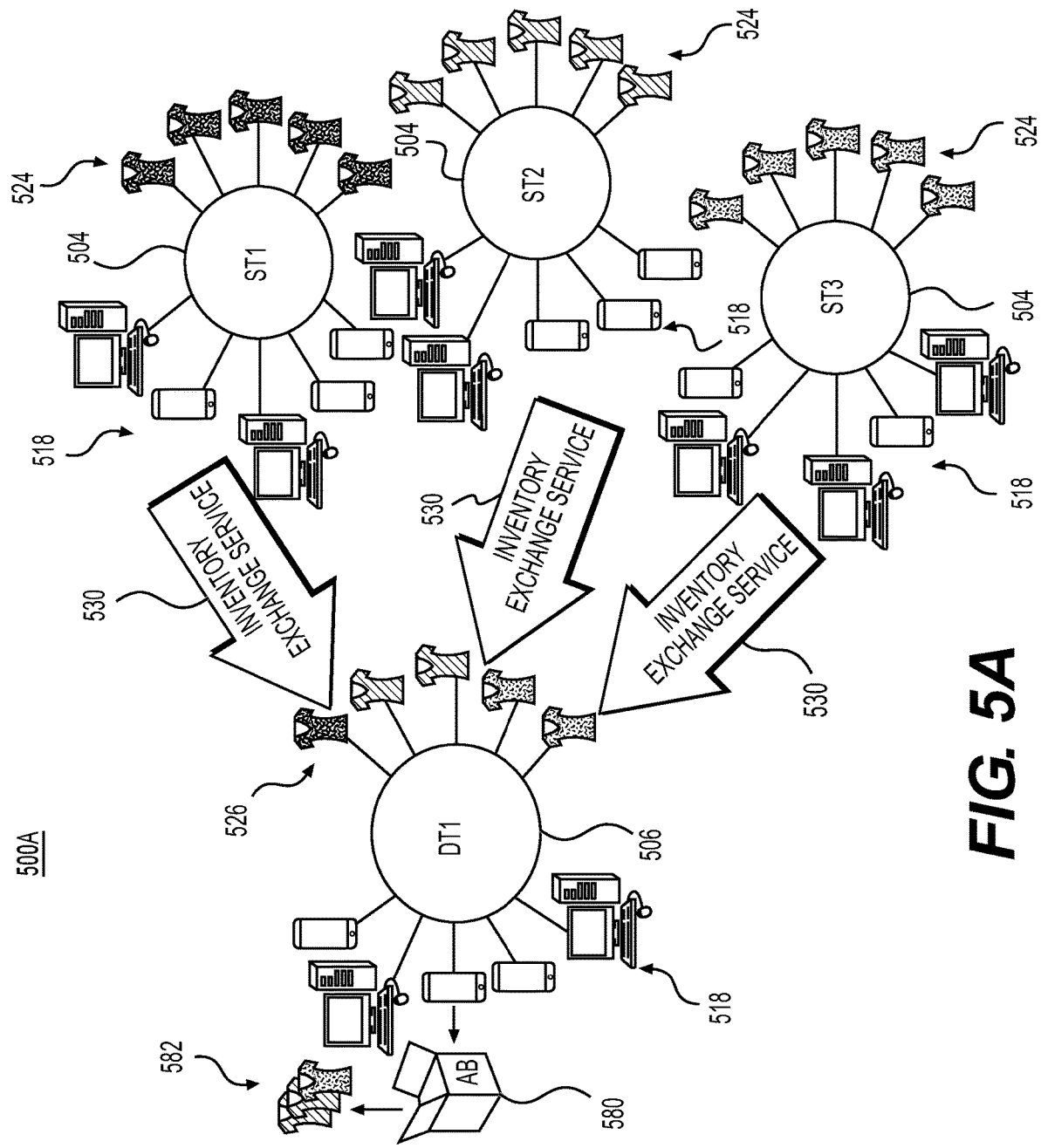
FIGS. 5A and 5B are diagrams of methods of use of an exemplary inventory exchange service by supply-side tenants and/or demand-side tenants.
Figure 5B:
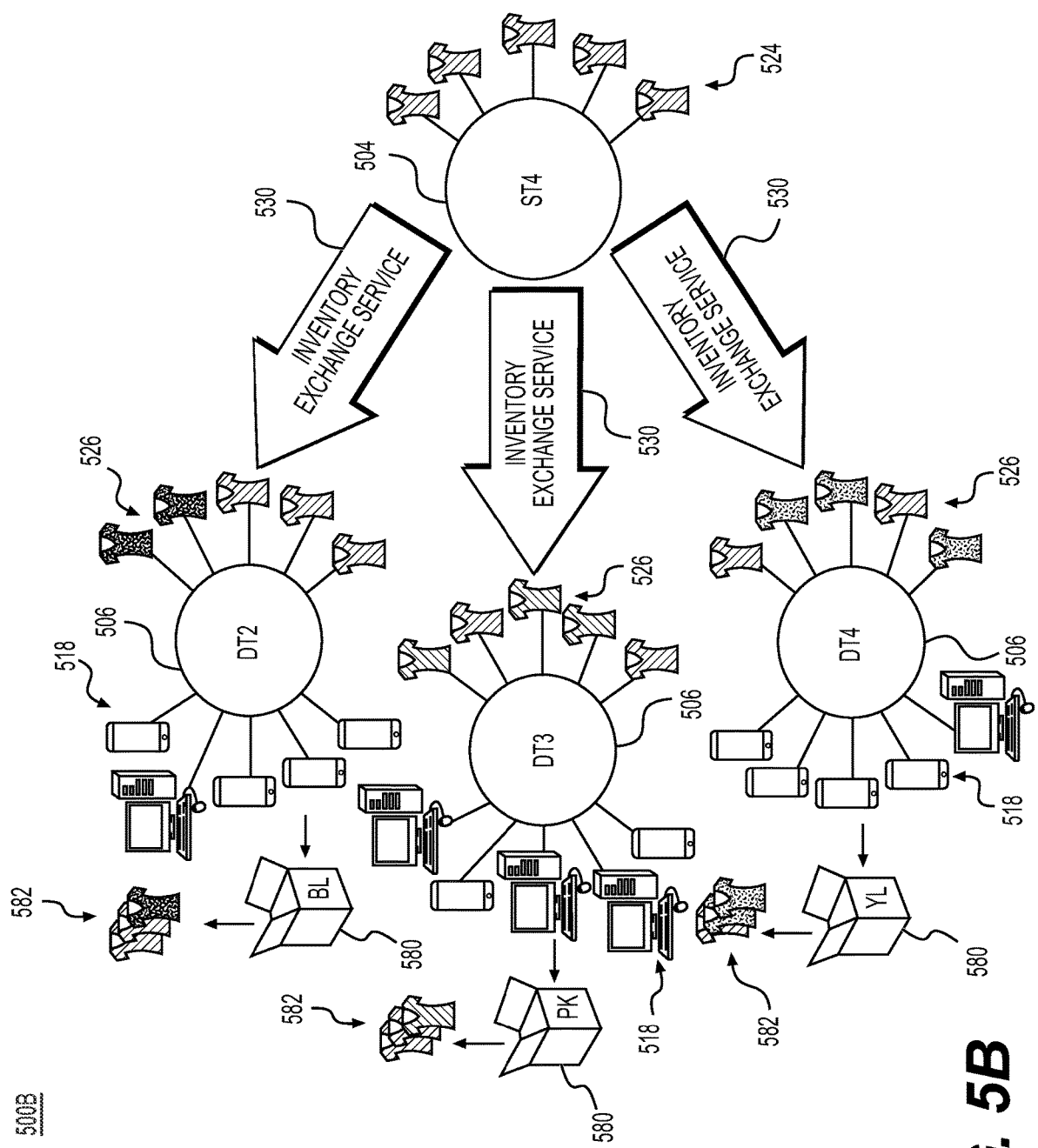
Figure 6:
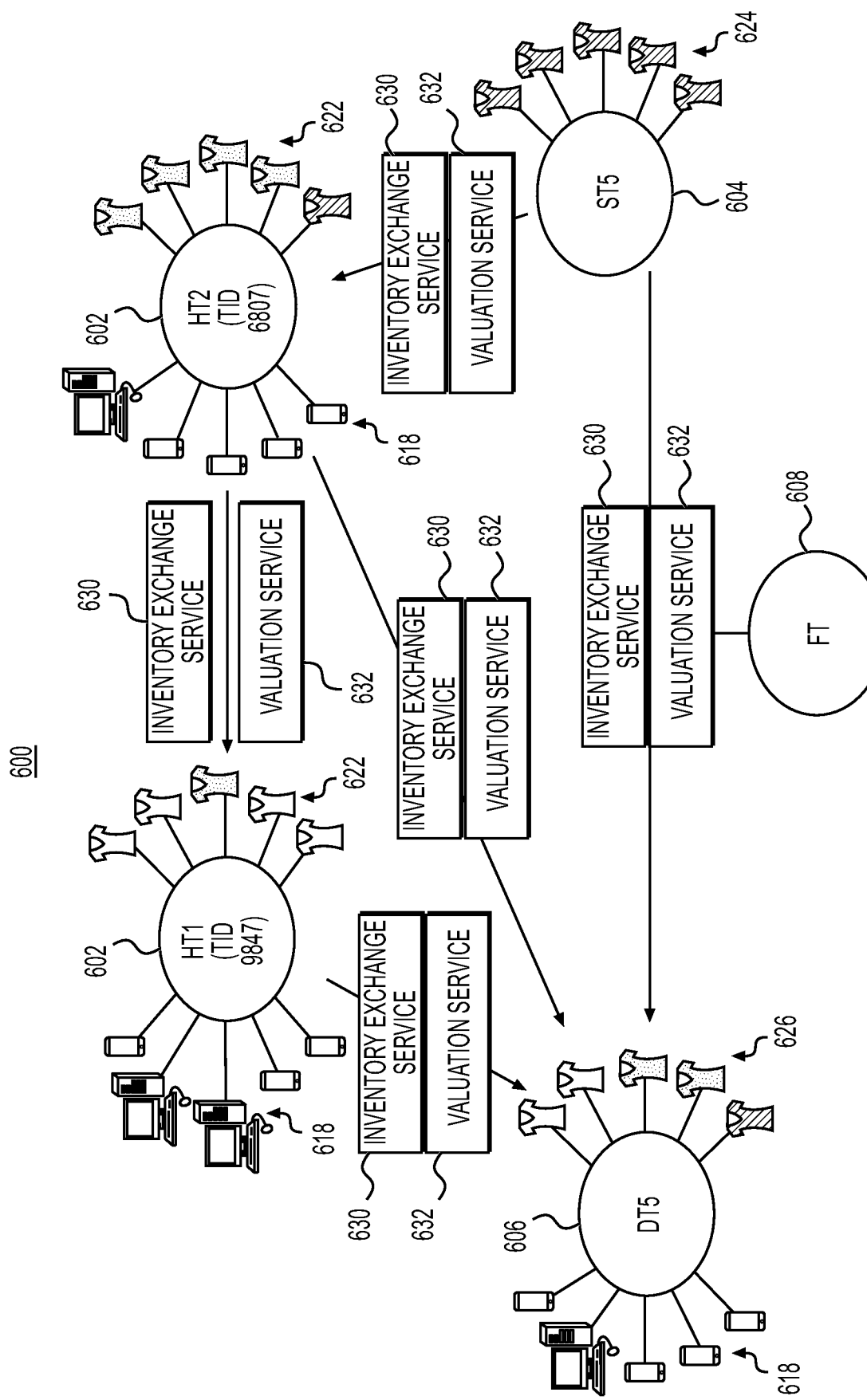
FIG. 6 is a diagram of methods of a plurality of tenants interacting with an exemplary inventory exchange and/or valuation services.

FIGS. 4-6 are diagrams illustrating implementations 400, 500, and 600, of environment 100, architecture 200, and/or server system 300 for operating a CaaS incorporating an inventory exchange. Implementations 400, 500, and 600 are simplified and exemplary. One or more of these implementations may include any of the features of another implementation, with or without the features shown in FIGS. 4-6 and/or features described below. For example, implementations 400 and 500 may incorporate a valuation service, as described with respect to implementation 600.

Implementations, such as implementations 400, 500, 600 may be useful to enable functionality that allows entities, such as a plurality of tenants, to cross list respective inventories. These implementations may be useful to share inventory, without the need to permanently assign articles of a physical inventory to a particular catalog or a particular tenant. This may enable existing tenants to source articles without the need to purchase additional physical inventory. An inventory exchange can, in at least some aspects, reduce cost to the tenants and reduce the barrier to entry for new tenants. Additionally or alternatively, the inventory exchange may allow tenants (e.g., hybrid tenants) to earn additional value from sunk or fixed costs incurred previously. Prior effort and investment to produce and curate a physical inventory may be applied to the inventory exchange, as described herein, to realize additional benefits for a hybrid tenant, for example. The inventory exchange implementations described herein may also enable operations of supply tenants that do not operate a tenant storefront and/or demand tenants that do not supply any physical inventory. Additionally, inventory exchange implementations, as described herein, may enable tenants to mix article sourcing methodologies and provide a physical inventory of high-confidence articles, while higher-risk articles may be placed in a storefront catalog by use of an exchange service, as described below.

IV.A. Implementation Incorporating Hybrid Tenants

FIG. 4 is a diagram illustrating an exemplary implementation 400 of environment 100, architecture 200, and/or server system 300 for operating a CaaS incorporating an inventory exchange. In the example illustrated in FIG. 4, a first tenant 402 (having an exemplary tenant ID 9847) may be associated with an inventory 422 that includes a plurality of articles. A second tenant 404 (having an exemplary tenant ID 6807) may be associated with an inventory 424 that includes a plurality of articles, each of the articles being included in a physical inventory of second tenant 404. Each tenant 402, 404 may be associated with one or more subscribing users 418 that receive requested articles 482 in one or more physical shipments 480. These subscribing users 418 may correspond to users 108, users 306, and devices associated with these users (e.g., user devices 112, 204) that request physical shipments 480 of articles 482 via one or more tenant storefronts 322. Each physical shipment 480 may correspond to a single tenant storefront 322 such that, a user 418 having multiple subscriptions may receive physical shipments 480 from a plurality of different storefronts 322, each shipment 480 being associated with a particular storefront 322.

In the example shown in FIG. 4, tenants 402 and 404 may be hybrid tenants 308, each in communication with user devices of subscribing users, or subscribing users 418, and inventories 422, 424, that include supplied articles. While second tenant 404 may be a hybrid tenant, as shown in FIG. 4, an entirety of the inventory of second tenant 404 may be comprised of articles 428 that were physically supplied by tenant 404. Thus, inventory 424 of second tenant 404 may be absent of any articles shared from another tenant. Inventory 422 of first tenant 402 may include one or more articles 426 that were supplied by first tenant 402 as part of a physical inventory of tenant 402, as well as one or more shared articles 428 included in a physical inventory of second tenant 404. In some aspects, each of articles 426 and 428 may be located in the same physical location (e.g., a single logistics center or warehouse). However, if desired, one or more of articles 426 and 428 may be present at different physical locations, such as warehouses, even when articles 426 and 428 are not currently at a location of a subscribing user.

Inventory 422 of tenant 402 may include a plurality of supplied articles 426 and one or more shared articles 428 that were incorporated via inventory exchange service 430, which may correspond to tenant inventory exchange services 224, per tenant catalog CMS 328, shared inventory CMS 330, portals 332, 334, 336, and/or microservices 356 (e.g., inventory exchange 360, exchange facilitation APIs 366, shared inventory tracking APIs 368). In some aspects, each of the supplied articles 426 and shared articles 428 may be different types of articles (e.g., different products and/or different styles) that are each associated with a unique identifier. Information corresponding to each inventory 422, 424 may be created, stored, and dynamically updated in one or more inventory exchange databases 410, which may correspond to one or more databases associated with data warehouse 390 and/or data warehouse systems 230. While not shown in FIGS. 5A, 5B, and 6, described below, inventory exchange databases 410 may include corresponding data for each of the implementations described with respect to FIGS. 5A, 5B, and 6.

IV.B. Implementation Incorporating Demand and Supply Tenants

FIGS. 5A and 5B are diagrams illustrating exemplary implementations 500A and 500B of environment 100, architecture 200, and/or server system 300. In the example illustrated in FIG. 5A, a plurality of supply tenants 504 may include first supply tenant ST1, second supply tenant ST2, and third supply tenant ST3. Each supply tenant 504 may include a separate physical inventory 524. These inventories 524 may include articles that were physically supplied by the supply tenant 504 (e.g., by manufacturing, purchasing, and/or shipping the articles to a distribution center or warehouse of a CaaS operator). For at least some supply tenants 504, inventory 524 may be comprised entirely of inventory supplied by the corresponding supply tenant 504. In the example illustrated in FIG. 5A, each supply tenant 504 may be associated with a plurality of subscribing users 518 and respective user devices. Each user 518 may be associated with a single tenant 504 (and thus be unique to this tenant 504), or may be associated with a plurality of tenants 504 (e.g., by subscribing to a plurality of tenants). In some aspects, when a single user 518 is associated with a plurality of tenants 504, a distinct unique user identifier may be assigned to this user 518 for each tenant association.

A demand tenant 506 (e.g., DT1) may have an inventory 526 of articles included in one or more storefront catalogs and be associated with a plurality of user devices of users 518. Inventory 526 may be formed entirely of articles that were supplied from one or more supply tenants 504. Inventory 526 may include, or be formed entirely of, articles that were supplied by and/or shared with supply tenants 504 (e.g., ST1-ST3), as facilitated by inventory exchange service 530, which may correspond to tenant inventory exchange services 224 and/or microservices 356.

With reference to FIG. 5B, a plurality of demand tenants 506 (e.g., DT2-DT4) may have respective inventories 526 and be associated with a plurality of user devices of users 518. Each inventory 526 may include, or be formed entirely of, articles that were supplied by and, if desired, shared with, a supply tenant 504 (e.g., ST4), as facilitated by inventory exchange service 530, which may correspond to tenant inventory exchange services 224, per tenant catalog CMS 328, shared inventory CMS 330, portals 332, 334, 336, and/or microservices 356 (e.g., inventory exchange 360, exchange facilitation APIs 366, shared inventory tracking APIs 368). In some implementations, one or more supply tenants 504 (e.g., ST4) may not be associated with any subscribing users 518 (e.g., a supply tenant 504 may not offer articles directly to users 518 and may not be associated with a storefront).

Each demand tenant 506 may be associated with one or more subscribing users 518 that receive requested articles 582 in one or more physical shipments 580 including closeted articles shipped from one or more logistics centers or warehouses. As shown in FIGS. 5A and 5B, each physical shipment 580 may include articles from one or more of the supply tenants 504. Physical shipments 580 may include information (e.g., an identifier or label) identifying the tenant 506 associated with the tenant storefront from which the articles 582 were closeted. If desired, such physical shipments 580 may be free of information identifying a tenant 504 that supplied one or more of the articles 582 included in the physical shipment 580.

IV.C. Implementation Incorporating Inventory Exchange Service Valuation Service, Hybrid Tenants FIG. 6 is a diagram illustrating exemplary implementation 600 of environment 100, architecture 200, and/or server system 300. As shown in FIG. 6, implementation 600 may include a plurality of hybrid tenants 602 (e.g., HT1 and HT2), one or more supply tenants 604 (e.g., ST5), and one or more demand tenants 606 (e.g., DT5), of which, tenants 602 and 606 are associated with one or more devices of subscribing users 618. Hybrid tenants 602 may include inventories 622 having one or more articles shared with and/or supplied by another tenant. Supply tenants 604 may include inventories 624 which are offered, via the inventory exchange, to one or more hybrid or demand tenants. Demand tenants 606 may include inventories 626 that are entirely formed by articles that are provided by and/or shared with other tenants. Similar to the above-described implementations 400 and 500, inventory exchange service 630 may facilitate inventory sharing and may correspond to tenant inventory exchange services 224, per tenant catalog CMS 328, shared inventory CMS 330, portals 332, 334, 336, and/or microservices 356 (e.g., inventory exchange 360, exchange facilitation APIs 366, shared inventory tracking APIs 368).

Implementation 600 may also include one or more facilitation tenants 608 that are configured to assist in inventory sharing operations of hybrid tenants 602, supply tenants 604, and/or demand tenants 606 via inventory exchange service 630 and/or valuation service 632. In the example illustrated in FIG. 6, facilitation tenant 608 may be configured to communicate with services 630 and 632 by exchange facilitation portal 336 (FIG. 3), for example, to facilitate inventory sharing of one or more articles associated with inventory 624 of supply tenant 604. Facilitation tenant 608 may, for example, be in communication with one or more supply tenants 604 via the inventory exchange, and may be configured to offer one or more articles in inventories 624 of supply tenants 604 (or inventories 622 of one or more hybrid tenants 602) on the inventory exchange. Facilitation tenants 608 may further be in communication with one or more demand tenants 606. These communications may allow facilitation tenants 608 to perform facilitation tasks such as inventory curation, valuation assignment, valuation settlement, and/or inventory transfer, via the inventory exchange and/or services 630 and 632.

V. Storage System Configuration

Figure 7B:
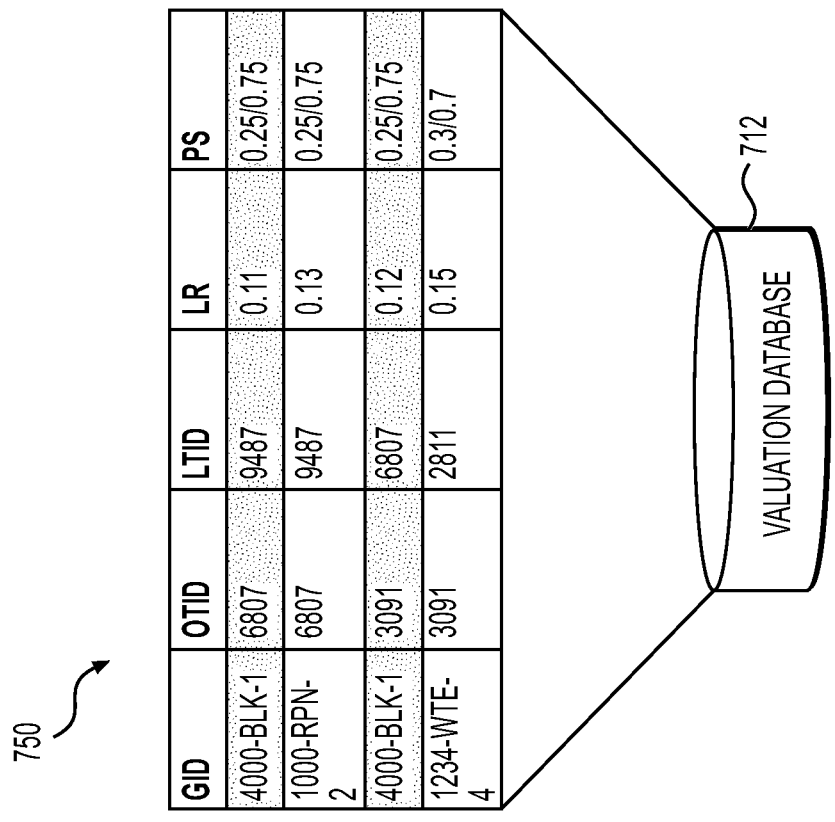
FIGS. 7A and 7B are representations of exemplary data stores, such as an inventory exchange and valuation databases, according to one or more embodiments.
Figure 7A:
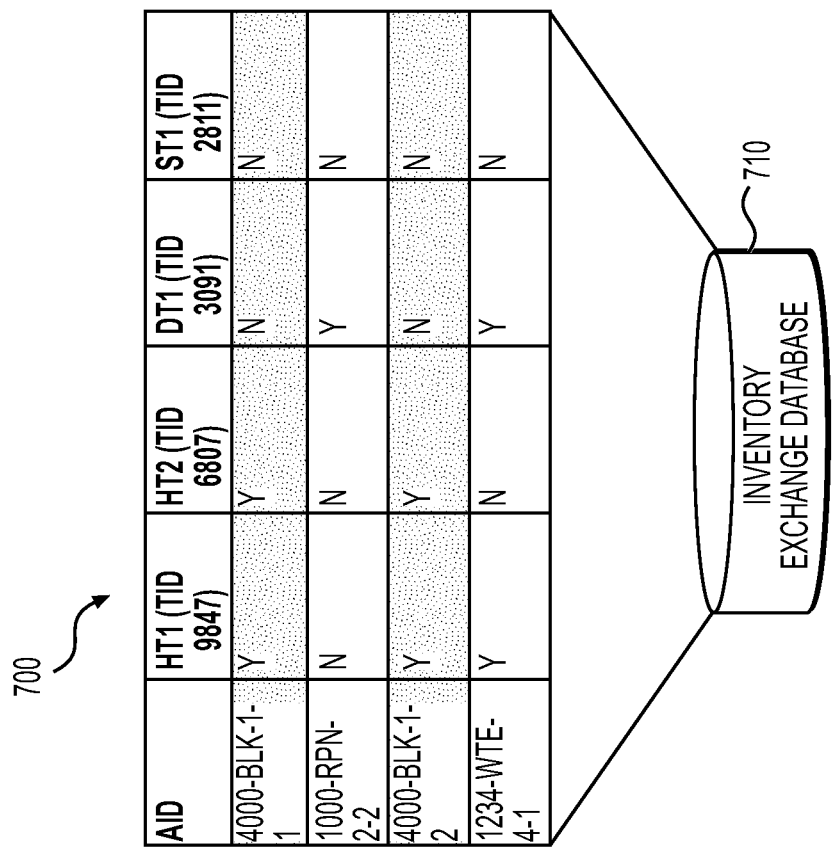

FIGS. 7A and 7B are diagrams illustrating exemplary information stored in an inventory exchange database 710 and valuation database 712. Databases 710 and/or 712 may correspond to one or more of data warehouse systems 230, data warehouse 390, and/or inventory exchange database 410. Inventory exchange database 710 may store information 700 in one or more data stores representative of inventory tracking information for one or more articles. In particular, information 700 may include one or more of a unique article identifier ("AID"), a unique tenant identifier ("TID"), and data representative of whether a particular article associated with the inventory exchange and/or a CaaS is included in an inventory of one or more tenants.

As shown in FIG. 7A, each article ID may include an alphanumeric string, numeric string, etc., indicative of characteristics of a particular physical article. Each article ID may correspond to a single physical article, and may encode information indicative of one or more characteristics of the article (e.g., size, color, style, season, etc.). Each tenant ID may correspond to a single tenant (or a particular storefront for tenants that maintain multiple storefronts). Tenant IDs stored in inventory exchange database 710 may include alphanumeric strings, numeric strings, or other unique identifiers. While the exemplary form of information 700 in FIG. 7A includes flags (e.g., binary flags represented by "Y" and "N" in FIG. 7A) indicative of each tenant having an inventory to which the article may be included, information 700 may include data in the form of a list of tenant identifiers corresponding to tenants that share a particular article.

Valuation database 712 may store information 750 in one or more data stores representative of valuation information associated with a plurality of tenants for a particular article. Information 750 may include one or more of an article group identifier ("GID") which may be indicative of a group of articles having the same characteristics (e.g., the same SKU, size, color, style, season, etc.), a supplier or owning tenant identifier ("OTID") indicative of an identity of a tenant that provided the article, a listing tenant identifier ("LTID") indicative of an identity of a tenant that includes the article in a catalog for presentation via one or more storefronts, valuation information including a listing rate ("LR") and price share ("PS"), and/or unique article identifiers (not shown). In some aspects, listing rates included in information 750 may be associated with a group identifier, owning tenant identifier, and listing tenant identifier, and may be representative of the above-described exchange listing value (e.g., a daily, weekly, monthly, or yearly fee) for listing an article associated with the group identifier in an exchange. Additionally or alternatively, a listing rate may include a period of time each shared article is rented to a user (e.g., a number of days extending from the day the article is shipped or received by the user until the day the article is return shipped or received at a warehouse). Purchasing share included in information 750 may be representative of a distribution of proceeds (e.g., on a percentage basis) when an shared article is purchased. In the first row of data represented in information 750, a purchasing share may be "0.25/0.75," or indicative of a share of 25% that is provided to the listing tenant associated with the corresponding LTID, while 75% is provided to the tenant associated with the corresponding OTID. If desired, each LR and PS for a GID/OTID pair may correspond to a plurality of articles. This plurality of articles may include, for example, different groups of articles such that each article within a group has the same style, color, and size, or other characteristics. In some embodiments, LR and PS values may be scaled upwards or downwards (e.g., by value assessment and assignment microservices 364) based on one or more article segmentations (e.g., a category of article, a suggested retail value of the article, historical demand for the article, current demand for the article, etc.).

VI. Facilitation Tenant System Environment

Figure 8:
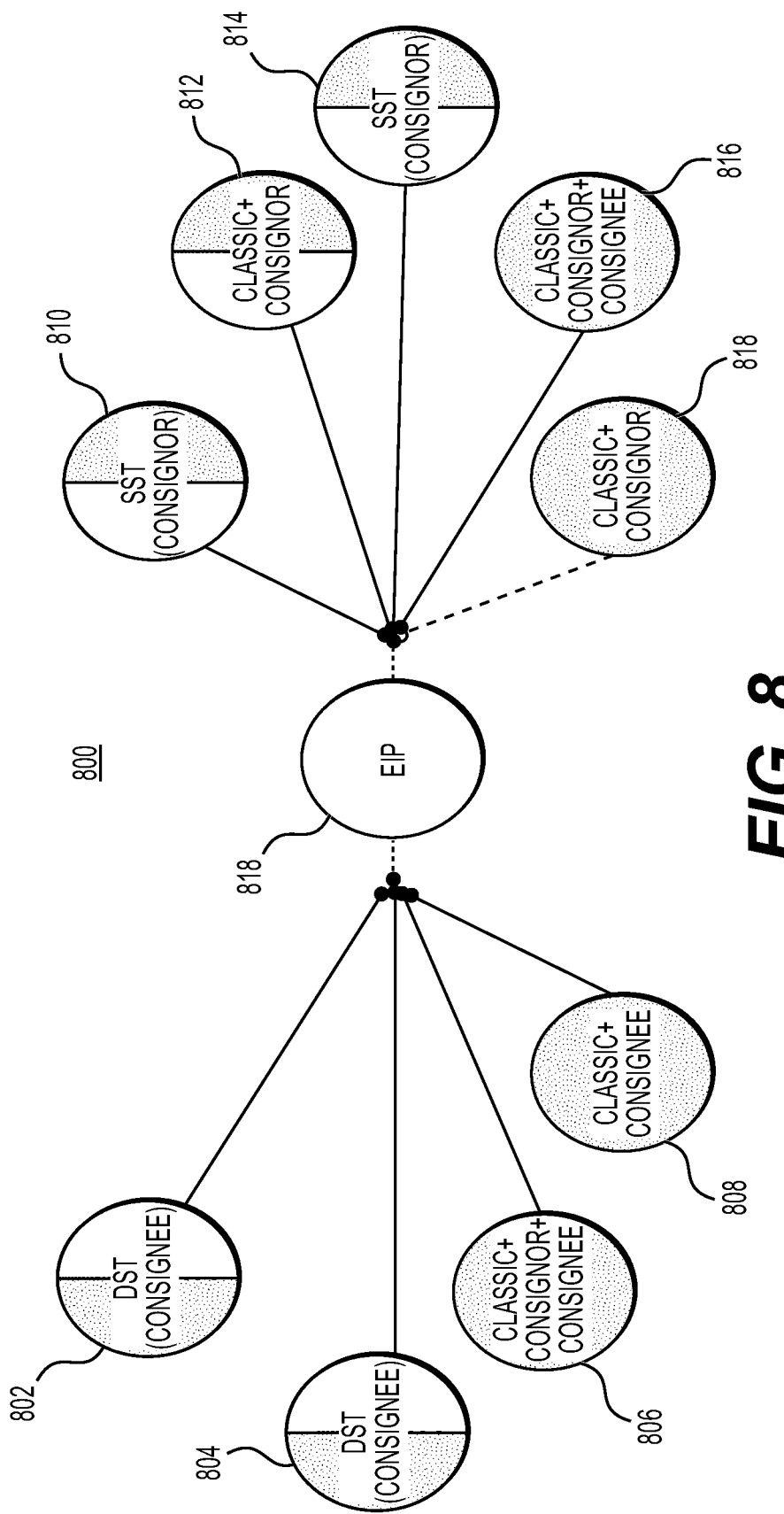
FIG. 8 is a diagram illustrating exemplary user roles for offering articles as a service, according to one or more embodiments.

FIG. 8 is a diagram showing relationships between tenants using an exchange intermediary program ("EIP") 818 in an exemplary system environment 800. EIP 818 may correspond to one or more features of the above-described inventory exchange, and may include features of architecture 200, such as applications for inventory sharing 216, tenant inventory exchange services 224, inventory management jobs 228, etc. EIP 818 may also include features of server system 300, such as exchange facilitation portal 336, exchange facilitation APIs 366, external services 320, shared inventory CMS 330, etc. System environment 800 illustrates exemplary interactions between tenants, and particular roles of these tenants, which may correspond to the above-described hybrid, demand, and supply tenants. Environment 100, architecture 200, and/or system 300 may enable actions of tenants that are analogous to consignee actions and/or consignor actions, thus enabling multiple roles for hybrid tenants, supply tenants, and demand tenants.

A first tenant 802 and a second tenant 804 may be enabled to perform actions associated with "pure" demand tenants, or a consignee, corresponding to demand tenants 312. Such a tenant may offer one or more articles for inclusion in a storefront for closeting by subscribing users 306, without offering any articles to the article exchange, and without supplying (e.g., manufacturing, purchasing, and/or shipping articles to a CaaS operator or warehouse) any physical articles for the storefront. A third tenant 806 may be enabled to perform actions associated with a hybrid tenant 308 that is both a consignor and a consignee (e.g., offers one or more articles via the exchange, and offers one or more shared articles via a storefront). A fourth tenant 808 may be enabled to perform actions associated with a hybrid tenant 308 that is a consignee (e.g., does not offer any articles via the exchange, and offers one or more shared articles via a storefront). Each of the tenants 802, 804, 806, and 808 may be "demand side" tenants. As used herein, a "demand side" tenant may maintain a storefront or plurality of storefronts having storefront catalogs that are comprised of articles, a majority or entirety of which were not supplied by the tenant associated with the storefront (e.g., shared articles), similar to the description of demand tenants above.

A fifth tenant 810 and a seventh tenant 814 may be enabled to perform actions associated with "pure" supply tenants, or a consignor, corresponding to supply tenants 310. Such tenants may offer one or more articles for inclusion in tenant storefronts via the exchange, without being associated with a storefront and without being associated with any subscribing users 306. A sixth tenant 812 and a ninth tenant 818 may be enabled to perform actions associated with a hybrid tenant 308 that is a consignor (e.g., offers one or more articles via the exchange, but offers no articles that were supplied by a different tenant via a tenant storefront). An eighth tenant 816 may be enabled to perform actions associated with a hybrid tenant 308 that is both a consignor and a consignee (e.g., offers one or more articles via the exchange, and offers one or more shared articles via a storefront). Each of the tenants 810, 812, 814, 816, and 818 may be "supply side" tenants. As used herein, a "supply side" tenant may maintain a storefront or plurality of storefronts having storefront catalogs that are comprised of articles, a majority or entirety of which were supplied by the tenant associated with the storefront, similar to the description of supply tenants above.

Figure 9:
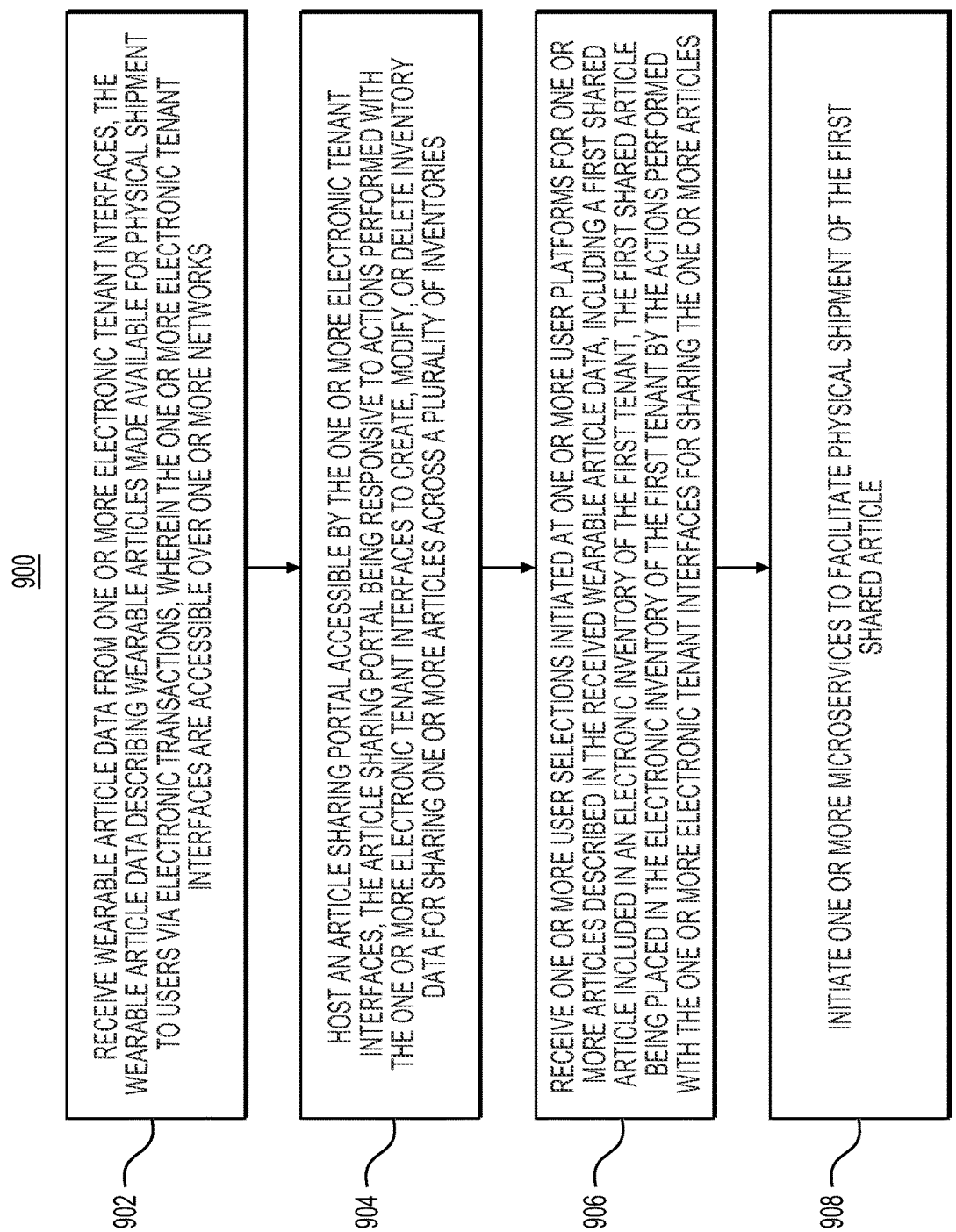
FIG. 9 is a flowchart of an exemplary method for dynamically managing inventory data associated with transactions of articles, such as wearable items, according to one or more embodiments.

VIII. Exemplary Method for Managing Data Associated with Electronic Inventory Management of Wearable Items FIG. 9 is a flowchart showing an exemplary method 900 for managing data associated with electronic inventory management of wearable articles, according to one or more embodiments. Prior to the below-described steps, method 900 may include physically receiving one or more articles in a warehouse or logistics center from one or more hybrid tenants and/or supply tenants. These articles may be processed, cleaned (if necessary), and stored so as to be available for inventory sharing and shipment to one or more subscribing users.

As shown in the exemplary method 900, a server system (e.g., server system 102 or server system 300) may receive wearable article data may receive wearable item data from one or more electronic tenant interfaces (e.g., via tenant catalog CMS 328, shared inventory CMS 330, and/or or applications for inventory sharing 216). This wearable item data may describe one or more wearable items, and/or other articles, made available for physical shipment to users via electronic transactions, wherein the one or more electronic tenant interfaces are accessible from one or more tenant devices (e.g., tenant devices 132 or employee devices 116) over one or more networks (Step 902). The wearable item data may describe one or more wearable items, and/or other articles, that are able to be listed on an inventory exchange or that are currently listed on an inventory exchange. The inventory exchange may allow one or more tenants to select listed wearable items and/or other items for inclusion in one or more catalogs.

Additionally, the server system (e.g., the server system 102 or the server system 300) may host an article sharing portal (e.g., shared inventory CMS 330, inventory transfer portal 332, inventory management portal 334, and/or exchange facilitation portal 336) that is accessible by the one or more electronic tenant interfaces (e.g., applications for inventory sharing 216, shared inventory CMS 330, inventory transfer portal 332, inventory management portal 334, and/or exchange facilitation portal 336), the article sharing portal being responsive to actions performed with the electronic tenant interfaces. The server system may be configured to, in response to these actions, create, modify or delete inventory data (e.g., data included in databases 106, inventory exchange data storage systems 226, data warehouse systems 230, and/or data warehouse 390) for sharing one or more articles across a plurality of inventories (e.g., articles included in one or more storefront catalogs) (Step 904).

The server system (e.g., the server system 102 or the server system 300) may receive one or more user selections (e.g., a user interaction with a tenant device 118, 132, and/or 142) initiated at one or more user platforms (e.g., the tenant storefront 322) for one or more articles described in the received article data, including a first shared article included in an electronic inventory of a first tenant (e.g., a supply tenant 120, demand tenant 136, additional tenant 146, hybrid tenant 308, supply tenant 310, demand tenant 312), the first shared article being placed in the electronic inventory of the first tenant by the actions performed with the one or more electronic tenant interfaces (e.g., applications for inventory sharing 216, shared inventory CMS 330, inventory transfer portal 332, inventory management portal 334, and/or exchange facilitation portal 336) for sharing the one or more articles (Step 906).

The server system (e.g., the server system 102 or the server system 300) may initiate one or more microservices (e.g., microservices 356) to facilitate physical shipment of the first shared article (Step 908). This article may be one or more articles supplied to a logistics center or warehouse as part of physical inventory of a tenant other than the first tenant (e.g., a hybrid tenant and/or supply tenant).

Although FIG. 9 shows example blocks of an exemplary method 900, in some implementations, the exemplary method 900 may include additional blocks, fewer blocks, different blocks, or differently arranged blocks than those depicted in FIG. 9. Additionally, or alternatively, two or more of the blocks of the exemplary method 900 may be performed in parallel.

Figure 10:
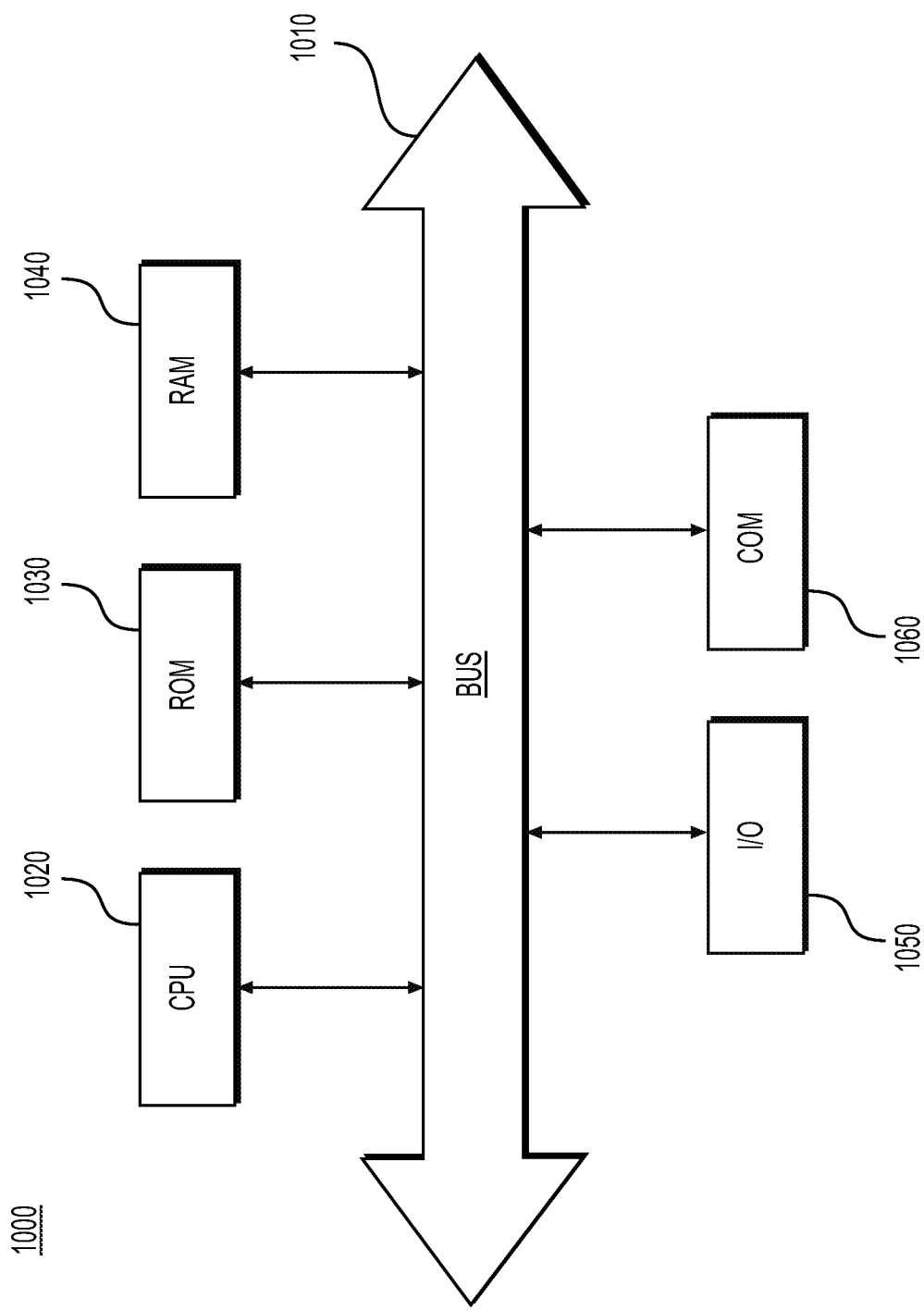
FIG. 10 depicts an exemplary computer device or system, in which embodiments of the present disclosure, or portions thereof, may be implemented.

FIG. 10 depicts an exemplary computer device or system, in which embodiments of the present disclosure, or portions thereof, may be implemented. In some implementations, server system 102, user devices 112, employee devices 116, tenant devices 118 and/or 132, tenant devices 202, user devices 204, internal system 206, external systems 212, server system 300, and/or any other computer system or user terminal for performing the various embodiments of the present disclosure, may correspond to device 1000. Additionally, each of the exemplary computer servers, databases, user interfaces, modules, and methods described above with respect to FIGS. 1-9 can be implemented in device 1000 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-9.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-10, may be implemented using a processor device 1000. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 10, a device 1000 used for performing the various embodiments of the present disclosure (e.g., server system 102, user devices 112, employee devices 116, tenant devices 118, 132, tenant devices 202, user devices 204, the internal system 206, the external system(s) 212, server system 300, and/or any other computer system or user terminal for performing the various embodiments of the present disclosure) may include a central processing unit (CPU) 1020. CPU 1020 may be any type of processor device including, for example, any type of special purpose or a general-purpose microprocessor device. As will be appreciated by persons skilled in the relevant art, CPU 1020 also may be a single processor in a multi-core/multiprocessor system, such system operating alone, or in a cluster of computing devices operating in a cluster or server farm. CPU 1020 may be connected to a data communication infrastructure 1010, for example, a bus, message queue, network, or multi-core message-passing scheme.

A device 1000 (e.g., server system 102, user devices 112, employee devices 116, tenant devices 118, 132, tenant devices 202, user devices 204, internal system 206, external system(s) 212, server system 300, and/or any other computer system or user terminal for performing the various embodiments of the present disclosure) may also include a main memory 1040, for example, random access memory (RAM), and may also include a secondary memory 1030. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable (e.g., computer-readable) storage medium having stored therein computer software and/or data (e.g., instructions).

In alternative implementations, secondary memory 1030 may include other similar means for allowing computer programs or other instructions to be loaded into device 1000. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1000.

A device 1000 may also include a communications interface ("COM") 1060. Communications interface 1060 allows software and data to be transferred between device 1000 and external devices. Communications interface 1060 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 1060. These signals may be provided to communications interface 1060 via a communications path of device 1000, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. A device 1000 also may include input and output ports 1050 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for managing data associated with electronic inventory management of wearable articles, the method comprising:
   receiving, by one or more processors, wearable article data from two or more different electronic tenant interfaces, the wearable article data describing wearable articles made available for physical shipment to users via electronic transactions, wherein the two or more different electronic tenant interfaces are accessible over one or more networks;
   hosting, by the one or more processors, an article sharing portal accessible by the two or more different electronic tenant interfaces based on two or more different tenant roles, the article sharing portal being responsive to actions performed with the two or more different electronic tenant interfaces to create, modify, or delete inventory data for sharing one or more articles across a plurality of inventories, wherein the inventory data is selected from one or more tenant article catalogs of an electronic storefront interface communicating with a plurality of external services and one or more microservices using an electronic storefront combination API, the one or more microservices communicating with a plurality of databases that are all dynamically updated based on each interaction with the article sharing portal, the plurality of databases including a data warehouse database that stores an identity and the two or more different tenant roles for at least two different tenants that participates in the inventory exchange via one or more interactions with the article sharing portal, the two or more different tenant roles including two or more of a supply tenant role, a demand tenant role, a hybrid tenant role, and a facilitation tenant role, the two or more different electronic tenant interfaces including two or more of a supply tenant interface, a demand tenant interface, a hybrid tenant interface, and a facilitation tenant interface, wherein each one of the two tenants has a different role and a different interface;
   receiving, by the one or more processors, one or more user selections initiated at one or more user platforms for one or more articles described in the received wearable article data, including a first shared article included in an electronic inventory of a first tenant, the first shared article being placed in the electronic inventory of the first tenant by the actions performed with the two or more different electronic tenant interfaces for sharing the one or more articles; and
   in response to receiving the one or more user selections, initiating the one or more microservices including a shared inventory tracking API and a warehouse API to initiate physical shipment of the first shared article to a user associated with the one or more user platforms, the shared inventory tracking API including a shared article assignment service component for managing associations between one or more articles and the one or more tenant article catalogs.

2. The computer-implemented method of claim 1, further comprising receiving, by the one or more processors, one or more user selections for a second article included in the electronic inventory of the first tenant, the second article being associated with a physical inventory of the first tenant, wherein the one or more microservices includes at least one microservice to facilitate physical shipment of the first shared article to the user together with the second article.

3. The computer-implemented method of claim 1, wherein the warehouse API updates an electronic inventory for a second tenant based on the user's selection of the first shared article in the electronic inventory for the first tenant.

4. The computer-implemented method of claim 1, wherein the shared inventory tracking API manages shared inventories of a plurality of tenants.

5. The computer-implemented method of claim 1, wherein the article sharing portal is configured to present, by the two or more different electronic tenant interfaces, a plurality of articles offered by one or more suppliers and available for inclusion in electronic inventories associated with respective tenants.

6. The computer-implemented method of claim 1, wherein the article sharing portal is configured to present, by the two or more different electronic tenant interfaces, one or more articles available for an inventory exchange for inclusion in one or more electronic inventories of one or more tenants.

7. The computer-implemented method of claim 1, wherein the one or more microservices include microservices for storefront management, inter-tenant inventory listing, or inter-tenant profit-sharing.

8. A computer system for managing data associated with electronic inventory management of wearable articles, the computer system comprising:
  a memory having processor-readable instructions stored therein; and one or more processors configured to access the memory and execute the processor-readable instructions, which when executed by the one or more processors configures the one or more processors to perform a plurality of functions, including functions for:
    receiving, by the one or more processors, wearable article data from two or more different electronic tenant interfaces, the wearable article data describing wearable articles made available for physical shipment to users via electronic transactions, wherein the two or more different electronic tenant interfaces are accessible over one or more networks;
    hosting, by the one or more processors, an article sharing portal accessible by the two or more different electronic tenant interfaces based on two or more different tenant roles, the article sharing portal being responsive to actions performed with the two or more different electronic tenant interfaces to create, modify, or delete inventory data for sharing one or more articles across a plurality of inventories, wherein the inventory data is selected from one or more tenant article catalogs of an electronic storefront interface communicating with a plurality of external services and one or more microservices using an electronic storefront combination API, the one or more microservices communicating with a plurality of databases that are all dynamically updated based on each interaction with the article sharing portal, the plurality of databases including a data warehouse database that stores an identity and the two or more different tenant roles for at least two different tenants that participates in the inventory exchange via one or more interactions with the article sharing portal, the two or more different tenant roles including two or more of a supply tenant role, a demand tenant role, a hybrid tenant role, and a facilitation tenant role, the two or more different electronic tenant interfaces including two or more of a supply tenant interface, a demand tenant interface, a hybrid tenant interface, and a facilitation tenant interface, wherein each one of the two tenants has a different role and a different interface;
    receiving, by the one or more processors, one or more user selections initiated at one or more user platforms for one or more articles described in the received wearable article data, including a first shared article included in an electronic inventory of a first tenant, the first shared article being placed in the electronic inventory of the first tenant by the actions performed with the two or more different electronic tenant interfaces for sharing the one or more articles; and
    in response to receiving the one or more user selections, initiating the one or more microservices including a shared inventory tracking API and a warehouse API to initiate physical shipment of the first shared article to a user associated with the one or more user platforms, the shared inventory tracking API including a shared article assignment service component for managing associations between one or more articles and the one or more tenant article catalogs.

9. The system of claim 8, wherein the functions further comprise receiving, by the one or more processors, one or more user selections for a second article included in the electronic inventory of the first tenant, the second article being associated with a physical inventory of the first tenant, wherein the microservices includes at least one service to facilitate physical shipment of the first shared article to the user together with the second article.

10. The system of claim 9, wherein the warehouse API updates an electronic inventory for a second tenant based on the user's selection of the first shared article in the electronic inventory for the first tenant.

11. The system of claim 9, wherein the shared inventory tracking API manages shared inventories of a plurality of tenants.

12. The system of claim 11, wherein the article sharing portal is configured to present, by the two or more different electronic tenant interfaces, a plurality of articles offered by one or more suppliers and available for inclusion in electronic inventories associated with respective tenants.

13. The system of claim 11, wherein the article sharing portal is configured to present, by two or more different electronic interfaces, one or more articles available for an inventory exchange for inclusion in one or more electronic inventories of one or more tenants.

14. The system of claim 9, wherein the one or more microservices include microservices for storefront generation, inter-tenant inventory listing, or inter-tenant profit-sharing.

15. A non-transitory computer-readable medium containing instructions for performing functions for managing data associated with electronic inventory management of wearable articles, the functions comprising:
  receiving wearable article data from two or more different electronic tenant interfaces, the wearable article data describing wearable articles made available for physical shipment to users via electronic transactions, wherein the two or more different electronic tenant interfaces are accessible over one or more networks,
  hosting an article sharing portal accessible by the two or more different electronic tenant interfaces based on two or more different tenant roles, the article sharing portal being responsive to actions performed with the two or more different electronic tenant interfaces to create, modify, or delete inventory data for sharing one or more articles across a plurality of inventories, wherein the inventory data is selected from one or more tenant article catalogs of an electronic storefront interface communicating with a plurality of external services and one or more microservices using an electronic storefront combination API, the one or more microservices communicating with a plurality of databases that are all dynamically updated based on each interaction with the article sharing portal, the plurality of databases including a data warehouse database that stores an identity and the two or more different tenant roles for at least two different tenants that participates in the inventory exchange via one or more interactions with the article sharing portal, the two or more different tenant roles including two or more of a supply tenant role, a demand tenant role, a hybrid tenant role, and a facilitation tenant role, the two or more different electronic tenant interfaces including two or more of a supply tenant interface, a demand tenant interface, a hybrid tenant interface, and a facilitation tenant interface, wherein each one of the two tenants has a different role and a different interface;

receiving one or more user selections initiated at one or more user platforms for one or more articles described in the received wearable article data, including a first shared article included in an electronic inventory of a first tenant, the first shared article being placed in the electronic inventory of the first tenant by the actions performed with the two or more different electronic tenant interfaces for sharing the one or more articles; and in response to receiving the one or more user selections, initiating the one or more microservices including a shared inventory tracking API and a warehouse API to initiate physical shipment of the first shared article to a user associated with the one or more user platforms, the shared inventory tracking API including a shared article assignment service component for managing associations between one or more articles and the one or more tenant article catalogs.

16. The non-transitory computer-readable medium of claim 15, wherein the functions further comprise receiving one or more user selections for a second article included in the electronic inventory of the first tenant, the second article being associated with a physical inventory of the first tenant, wherein the one or more microservices includes at least one service to facilitate physical shipment of the first shared article to the user together with the second article.

17. The non-transitory computer-readable medium of claim 15, wherein the warehouse API updates an electronic inventory for a second tenant based on the user's selection of the first shared article in the electronic inventory for the first tenant.

18. The non-transitory computer-readable medium of claim 15, wherein the shared inventory API manages shared inventories of a plurality of tenants.

19. The non-transitory computer-readable medium of claim 18, wherein the article sharing portal is configured to present, by the two or more different electronic tenant interfaces, a plurality of articles offered by one or more suppliers and available for inclusion in electronic inventories associated with respective tenants.

20. The non-transitory computer-readable medium of claim 18, wherein the article sharing portal is configured to present, by two or more different electronic interfaces, one or more articles available for an inventory exchange for inclusion in one or more electronic inventories of one or more tenants.

* * * * *